United States Patent
Kawamura et al.

(10) Patent No.: US 7,717,348 B2
(45) Date of Patent: May 18, 2010

(54) SEMICONDUCTOR MEMORY CARD

(75) Inventors: Hiromi Kawamura, Hiroshima (JP); Eiji Ueda, Hiroshima (JP)

(73) Assignee: Panasonic Corporation, Osaka (JP)

(*) Notice: Subject to any disclaimer, the term of this patent is extended or adjusted under 35 U.S.C. 154(b) by 974 days.

(21) Appl. No.: 10/586,466

(22) PCT Filed: May 18, 2005

(86) PCT No.: PCT/JP2005/009493

§ 371 (c)(1),
(2), (4) Date: Jul. 17, 2006

(87) PCT Pub. No.: WO2005/116918

PCT Pub. Date: Dec. 8, 2005

(65) Prior Publication Data

US 2008/0251586 A1    Oct. 16, 2008

(30) Foreign Application Priority Data

May 25, 2004 (JP) .............................. 2004-154048

(51) Int. Cl.
*G06K 19/06* (2006.01)
*G06K 19/00* (2006.01)
(52) U.S. Cl. ...................... 235/492; 235/487
(58) Field of Classification Search .................. 235/451, 235/487

See application file for complete search history.

(56) References Cited

U.S. PATENT DOCUMENTS

| 6,098,890 A | 8/2000 | Kreft et al. |
| 6,398,116 B1 | 6/2002 | Kreft |
| 2006/0157566 A1 * | 7/2006 | Kawasaki et al. ........... 235/451 |

FOREIGN PATENT DOCUMENTS

| DE | 195 09 517 | 10/1996 |
| DE | 197 26 335 | 12/1998 |
| EP | 1 111 557 | 6/2001 |
| JP | 2003-123129 | 4/2003 |
| JP | 2004341702 A * | 12/2004 |
| WO | 2005/038703 | 4/2005 |

\* cited by examiner

*Primary Examiner*—Thien M. Le
*Assistant Examiner*—Sonji Johnson
(74) *Attorney, Agent, or Firm*—Wenderoth, Lind & Ponack, L.L.P.

(57) ABSTRACT

A semiconductor memory card includes a direction obtainment unit which obtains a first access direction type in which the semiconductor memory card accesses the reader/writer; a condition management unit which previously hold and manages an access condition including two or more of second access direction types; a condition judgment unit which compares two or more of the first access direction types and two or more of the second access direction types, and judges whether or not they match each other; and an execution unit which executes a predetermined application program when it is judged that the first and second access direction types match each other.

12 Claims, 27 Drawing Sheets

Prior Art

Prior Art

Prior Art

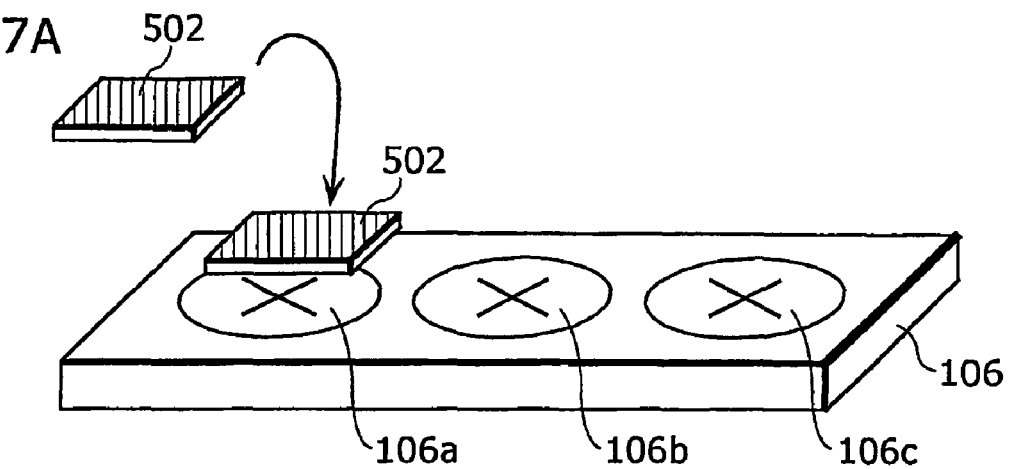
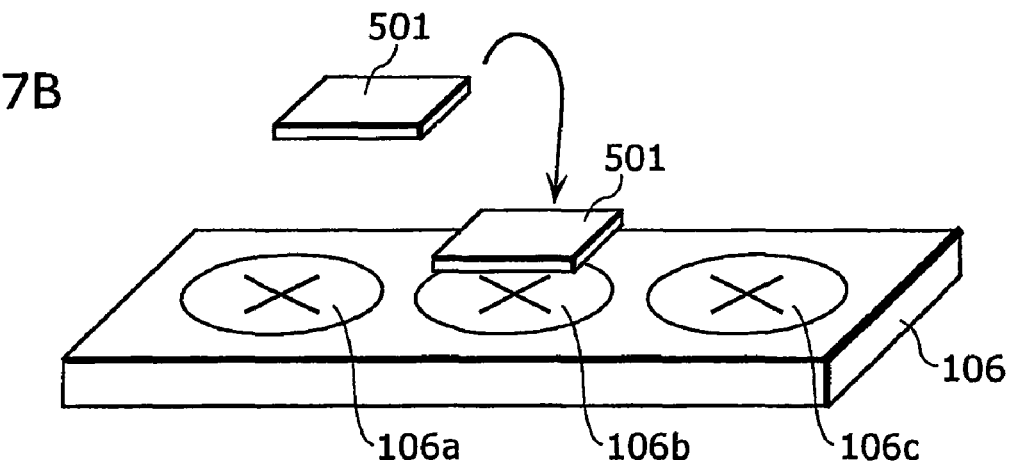
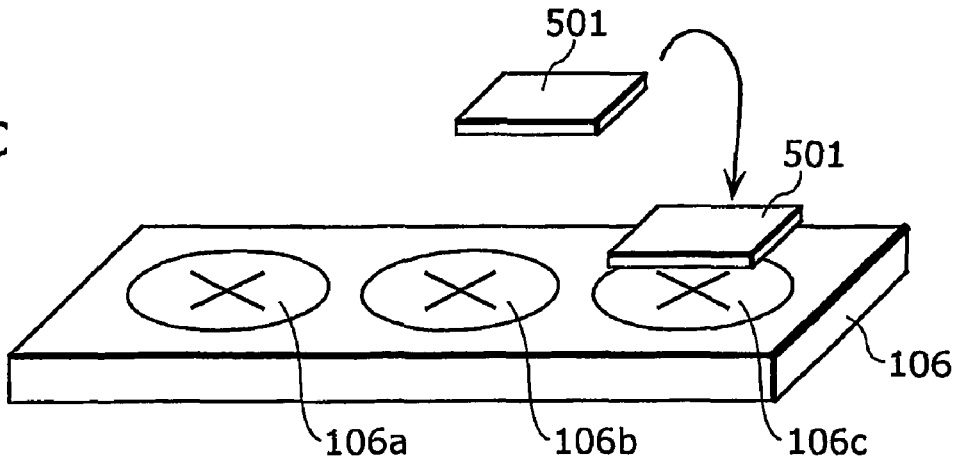

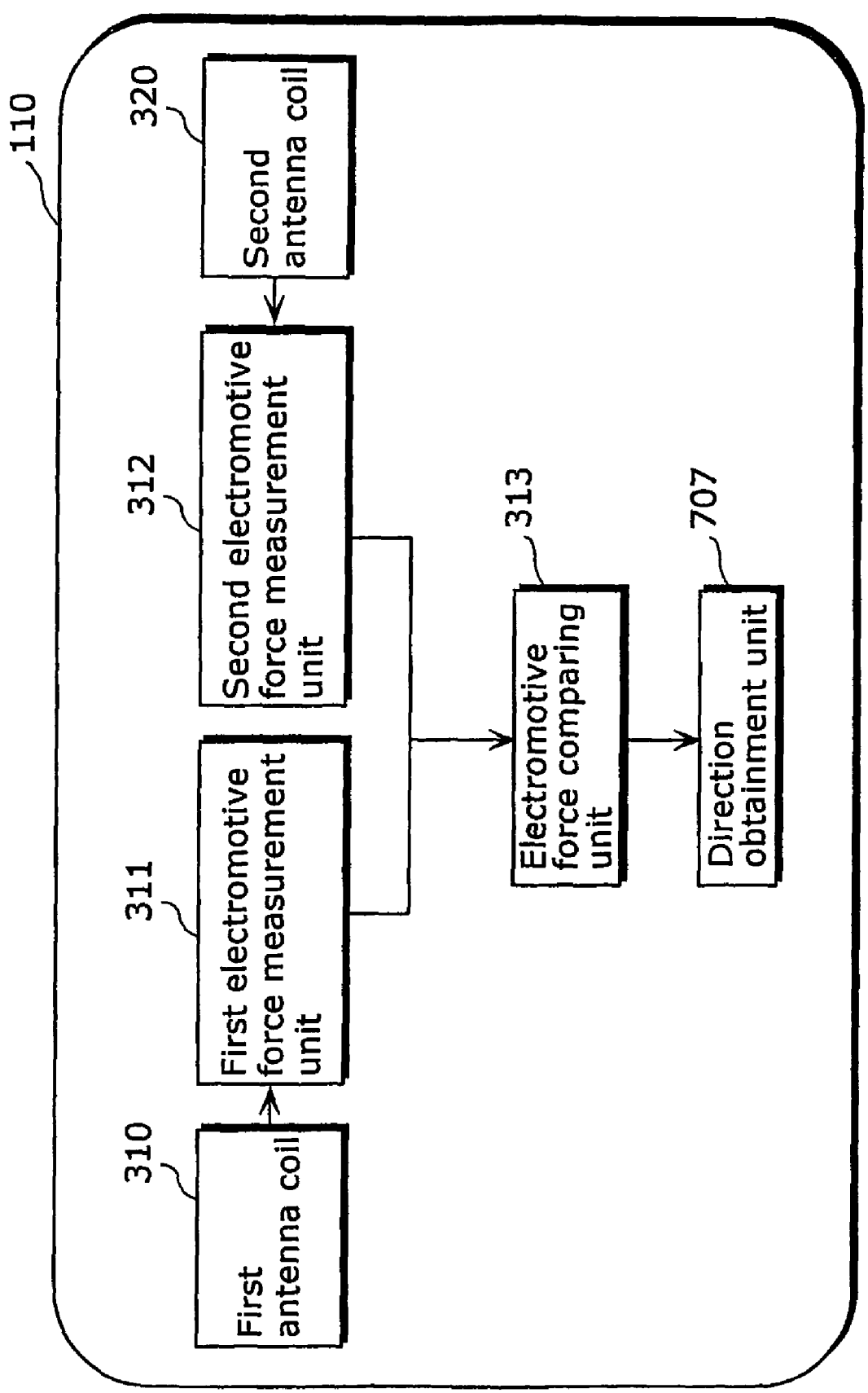

Distance to reader/writer

Time of passing reader/writer

FIG. 16

| Service type | APL_ID | Access state | | | | | | | Access direction |
|---|---|---|---|---|---|---|---|---|---|
| | | Access time | | | | | | | |
| E_SRV1 | 0001h | 04.3.3,12:24:55 | 07D5h | 03h | 03h | 0Ch | 18h | 37h | 88h |
| E_SRV1 | 0001h | 04.3.3,12:24:56 | 07D5h | 03h | 03h | 0Ch | 18h | 38h | 94h |

| b8 | b7 | b6 | b5 | b4 | b3 | b2 | b1 | Indication | Value |
|---|---|---|---|---|---|---|---|---|---|
| Front back verification flag | | Front=0 Back=1 | | Up | Down | Left | Right | | |
| 1 | 0 | 0 | 0 | 0 | 0 | 0 | 0 | Front side | 80h |
| 1 | 0 | 0 | 0 | 1 | 0 | 0 | 0 | Front side up | 88h |
| 1 | 0 | 0 | 0 | 0 | 1 | 0 | 0 | Front side down | 84h |
| 1 | 0 | 0 | 0 | 0 | 0 | 1 | 0 | Front side left | 82h |
| 1 | 0 | 0 | 0 | 0 | 0 | 0 | 1 | Front side right | 81h |
| 1 | 0 | 0 | 1 | 0 | 0 | 0 | 0 | Back side | 90h |
| 1 | 0 | 0 | 1 | 1 | 0 | 0 | 0 | Back side up | 98h |
| 1 | 0 | 0 | 1 | 0 | 1 | 0 | 0 | Back side down | 94h |
| 1 | 0 | 0 | 1 | 0 | 0 | 1 | 0 | Back side left | 92h |
| 1 | 0 | 0 | 1 | 0 | 0 | 0 | 1 | Back side right | 91h |
| 0 | 0 | 0 | 0/1 | 0 | 0 | 0 | 0 | side 1/side 2 | 00h/10h |
| 0 | 0 | 0 | 0/1 | 1 | 0 | 0 | 0 | side 1/side 2 up | 08h/18h |
| 0 | 0 | 0 | 0/1 | 0 | 1 | 0 | 0 | side 1/side 2 down | 04h/14h |
| 0 | 0 | 0 | 0/1 | 0 | 0 | 1 | 0 | side 1/side 2 left | 02h/12h |
| 0 | 0 | 0 | 0/1 | 0 | 0 | 0 | 1 | side 1/side 2 right | 01h/11h |

Column labels: 1100 (b8), 1101 (b7, b6, b5), 1102 (b4), 1103 (b3), 1104 (b2), 1105 (b1), 1106 (Indication), 1107 (Value).

Row labels: 1108–1122 for the 15 data rows.

FIG. 18

| | | | | Access conditions | | | | |
|---|---|---|---|---|---|---|---|---|
| | | | | | Time series pattern | | | |
| Service type | APL_ID | Comparison times | Time limit | | | nbyte | | |
| | 2byte | 1byte | 1byte | | | | | |
| E_SRV1 | 0001h | 02h | 04h | 80h | 94h | ✕ | ✕ | ✕ |
| E_SRV2 | 0004h | 04h | 08h | 10h | 00h | 10h | 10h | ✕ |
| E_SRV3 | 2200h | 00h | 00h | ✕ | ✕ | ✕ | ✕ | ✕ |
| E_SRV4 | 0120h | 04h | 0Ch | 82h | 91h | ✕ | 80h | 80h |
| ... | ... | ... | ... | ... | ... | ... | ... | ... |
| E_SRVi | 3312h | 03h | 0Fh | 11h | 01h | 02h | ... | ... |
| ... | ... | ... | ... | ... | ... | ... | ... | ... |
| E_SRVn | 0912h | 02h | 09h | 01h | 12h | ✕ | ✕ | ✕ |

SEMICONDUCTOR MEMORY CARD

BACKGROUND OF THE INVENTION

1. Technical Field

The present invention relates to a semiconductor memory card which performs contactless communication with a reader/writer.

2. Background Art

A system which employs a semiconductor memory card (contactless semiconductor memory card) which performs contactless communication with a reader/writer has been used in wide range of fields such as mass media, financial institutions, governments, and municipalities. It is because of the convenience and security of the contactless semiconductor memory card. Specifically, it is convenient for a user that the user can enjoy a service only by passing the contactless semiconductor memory card over the IC card reader/writer, that is, only by bringing it closer to the reader/writer. Also, in order to receive a service, the security is secured that the user does not need to present confidential information in the IC card to the outside. As such contactless semiconductor memory card, a typical example is a contactless IC card (hereafter it may be simply referred to as "IC card").

FIG. 1 is a drawing showing usage patterns of a general IC card. A user can enjoy a service only by passing IC card 110 over reader/writer 106. Even if the IC card is passed over reader/writer 106 while keeping IC card 110 in a purse or a bag or connecting IC card 110 to portable device 107, the user can enjoy the similar service as in the case of using the IC card itself.

FIG. 2 is a diagram showing a hardware structure of the general IC card. The IC card includes antenna coil 310, ROM 301, RAM 302, CPU 303, Electrically Erasable Programmable Read Only Memory (EEPROM) 304. Antenna coil 310 receives power supply from an external device, and communicates with the external device. ROM 301 stores a program. RAM 302 temporally stores data used for executing a program. CPU 303 controls various command processing according to the program stored in ROM 301. EEPROM 304 is a rewritable memory, in which a program downloaded from the outside is stored.

In general, as a characteristic of the IC card, not to mention that the IC card has larger memory storage than a magnetic card, it can be said that the security function for personal information and the like stored in the IC card is tightened.

Conventionally, the service realized by a single IC card had been a single service such as electronic money. However, in recent years, it has been proposed to realize more than one services using single IC card due to increases of memory storage in the IC card and of processing speed of CPU in the IC card.

Consequently, the user can enjoy various services using single IC card without having many different IC cards. Thus, multiple applications are installed in the IC card corresponding to multiple services. Therefore, hereafter, the IC card corresponding to multiple services may be referred to as "multi-application IC card".

FIG. 3 is a diagram showing a software structure of the general IC card. Software of IC card 110 has a three-layered structure. The bottom layer has memory area 405 for application programs; the middle layer has OS 404; and the top layer has at least one application program.

Here, it is shown as an example that in the top layer, there are i numbers of EC client application programs (C_E_APL) 401, 402, . . . , and 40i. These C_E_APL 401, 402, . . . , and 40i respectively correspond to i numbers of EC server application programs (E_APL) 101, 102, . . . , and 10i that are not shown in the diagram.

Thus, each application program corresponds to each service. Therefore, hereafter, the application program may be referred to as a "service".

SUMMARY OF THE INVENTION

The user can enjoy a service only by passing the IC card over the reader/writer. Accordingly, there is a problem that the service is executed contrary to the user's intention if the IC card is brought closer to the reader/writer due to an unintended reason of the user. That is, in the case where the IC card is dropped on the reader/writer, the service may be executed in contrary to the user's intention.

Thus, the problem that the service is executed contrary to the users's intention can be occurred similarly when a service wished to be executed is selected from among multiple services.

That is, there is a case where two services (e.g. C_E_APL 401 and 402) are stored in an IC card. In this case, even if the user intends to execute C_E_APL 401, C_E_APL 402 is executed contrary to the user's intention when the reader/writer corresponds only to C_E_APL 402.

Further, there is a case where C_E_APL 401 and C_E_APL 402 are separately stored in two IC cards. In this case, the user may pass the IC card in which C_E_APL 402 is stored over the reader/writer even if the user intends to execute C_E_APL 401. Herein, when the reader/writer corresponds both of C_E_APL 401 and C_E_APL 402, C_E_APL 402 is executed contrary to the user's intention.

For example, in the case where an electronic money service is executed contrary to the user's intention, the electronic money in the IC card is reduced. In this case, the user has to deal with burdensome procedure such as requesting a service corporation to return the reduced electronic money.

An object of the present invention is to provide a semiconductor memory card for solving the conventional problem, which can execute an application program after verifying a user's decision.

In order to solve the conventional problem, a semiconductor memory card according to the present invention is a semiconductor memory card which performs contactless communication with a reader/writer, the semiconductor memory card comprising: a direction obtainment unit operable to obtain a first access direction type in which the semiconductor memory card accesses the reader/writer; a condition management unit operable to previously hold and manage an access condition including two or more of second access directions types; a condition judgment unit operable to compare two or more of the first access direction types obtained by the direction obtainment unit with two or more of the second access direction types included in the access condition held in the condition management unit, and to judge whether or not the first and second access direction types match each other; and an execution unit operable to execute a predetermined application program when the condition judgment unit judges that the first and the second access direction types match each other. Accordingly, the service is not executed unless a user passes the semiconductor memory card at least twice over the reader/writer. That is, the application program can be executed after the intention of the user is surely verified.

Here, the access condition includes a time series pattern of the second access direction types, and the condition judgment unit may compare the first and second access direction types according to the time series pattern. Accordingly, it is able to be judged whether or not the time series pattern of the access direction type satisfies a predetermined condition.

Further, one of the access direction types may be an access side type which is one of a front side and a back side of the semiconductor memory card. Accordingly, it is able to be judged whether or not the access side type of the semiconductor memory card satisfies the predetermined condition.

Furthermore one of the access direction types may be a horizontal access direction type on a same side of the semiconductor memory card. Accordingly, it is able to be judged whether or not the access direction type on a same side of the semiconductor memory card satisfies the predetermined condition.

Also, the direction obtainment unit may obtain the first access direction types upon a lapse of a predetermined time from a point at which electric power is generated by electromagnetic waves supplied by the reader/writer exceeds a predetermined voltage. Accordingly, a changed access direction type can be obtained every time when the access direction type is changed.

Further, the access condition includes a number of comparisons of the first and second access direction types, and the condition judgment unit may compare the first and second access direction types as many as the number of comparisons. Accordingly, the intention of the user can be verified more surely as increasing the number of comparisons.

Furthermore, the access condition includes a time limit for the semiconductor memory card to access the reader/writer, the condition judgment unit is operable to judge whether or not an elapsed time from a first access to a completion of comparisons as many as the number of comparisons is within the time limit, and the execution unit may execute the predetermined application program when the condition judgment unit judges that the elapsed time is within the time limit. Accordingly, it is able to avoid the inconvenience that a service is executed for a user who requires time more than needed.

In addition, the semiconductor memory card further comprises a condition obtainment unit operable to obtain the access condition from an external device, wherein the condition management unit may store and manage the access condition. Accordingly, it is able to immediately respond to when the access condition needs to be changed.

It should be noted that the present invention can be also realized as a method having characteristic constituents of such semiconductor memory card as steps, a program for causing a computer to execute the steps, a recording medium such as CD-ROM in which the program is stored, and as an integrated circuit. The program can be transmitted through a transmission medium such as communication network.

As further information about technical background to this application, the disclosure of Japanese Patent Application No. 2004-154048 filed on May 25, 2004 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIGS. 7A, FIG. 7B, and FIG. 7C are drawings showing another usage of the IC card according to the present invention.

FIG. 9 is a functional block diagram of the IC card according to the present invention.

FIG. 16 is a table showing an internal structure of a history management table.

FIG. 17 is a table showing detailed indications of values of the access directions.

FIG. 18 is a table showing an internal structure of a condition management table.

DETAILED DESCRIPTION OF THE INVENTION

Hereafter, it is described about embodiments of the present invention with references to drawings. Here, as a contactless semiconductor memory card according to the present invention, a contactless IC card which corresponds to multi-applications and included a tamper-resistant module is used as an example.

It should be noted that, hereafter, it is described based on an assumption that an IC card exists above a reader/writer. For example, when a front side of the IC card is passed over the reader/writer, it is described simply that "the back side of the IC card is faced up".

Further, it can be called as left side, right side, up side and down side of IC card. In a state where a longitudinal direction of the IC card is horizontally placed, in the case where the front or back side of the IC card is seen, the left side of the IC card is assumed to be a left area of a seen side. The same thing applies to right side, up side and down side.

First Embodiment

Figure 4:
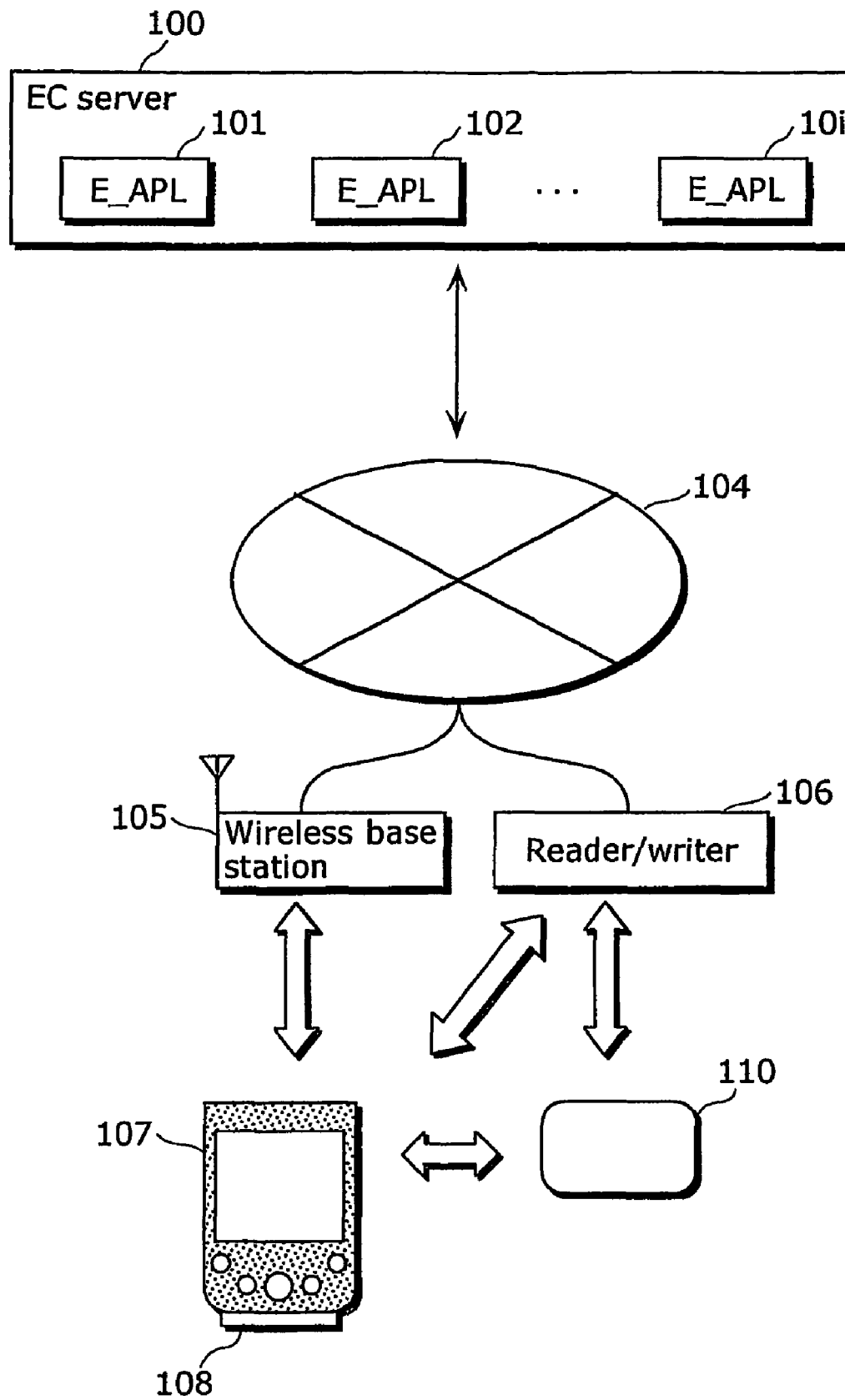
FIG. 4 is a drawing showing an environment in which an IC card according to the present invention is used.

FIG. 4 is a drawing showing an environment where an IC card according to the present invention is used.

In the usage environment, there are EC server 100, network 104, wireless base station 105, reader/writer 106, portable device 107, extended reader/writer 108 of portable device 107, and IC card 110. A user can enjoy a service using IC card 110. IC card 110 can be solely used, can be used in a state where it is connected to portable device 107, and can be used in a state where it is connected to extended reader/writer 108 of portable device 107.

EC server 100 provides EC service to IC card 110 via network 104 and wireless base station 105 or reader/writer 106. In EC server 100, i numbers of E_APL 101 to 10i are operated. These E_APL 101 to 10i provide respective unique EC services to IC card 110.

Wireless base station 105 is a device equipped on a roof top of a building and a top of a power pole, and inputs and outputs data with cell phone shaped portable device 107. Wireless base station 105 is connected to EC server 110 via network 104. Through wireless base station 105, IC card 110 can receive EC service of EC server 100.

Reader/writer 106 is specifically a cash dispenser of a credit company, and inputs and outputs data with IC card 110. Reader/writer 106 is connected to EC server 110 via network 104. Through reader/writer 106, IC card 110 can receive EC service of EC server 100.

Portable device 107 is a device which accesses IC card 110. In portable device 107, browser software and the like are installed. The user can access data in IC card 110 via a user interface of the browser software. In addition, extended reader/writer 108 can be equipped in portable device 107.

FIG. 5 are drawings showing a usage pattern of the IC card according to the present invention. Here, in order to distinguish front side 501 and back side 502 of the IC card, back side 502 is indicated as shaded areas.

Hereafter, passing front side 501 of the IC card is passing over reader/writer 106 is indicated that "the IC card is passed over reader/writer 106, while facing the back side 502 up". Also, passing back side 502 of the IC card over reader/writer 106 is indicated that "the IC card is passed over the reader/writer facing the front side 501 up".

Figure 5A:
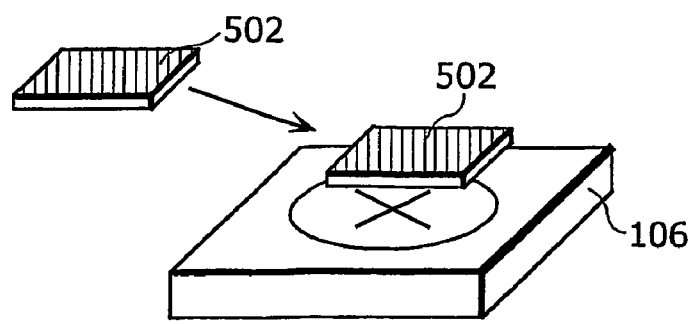
FIG. 5A, FIG. 5B, FIG. 5C, FIG. 5D and FIG. 5E are drawings showing a usage of the IC card according to the present invention.
Figure 5B:
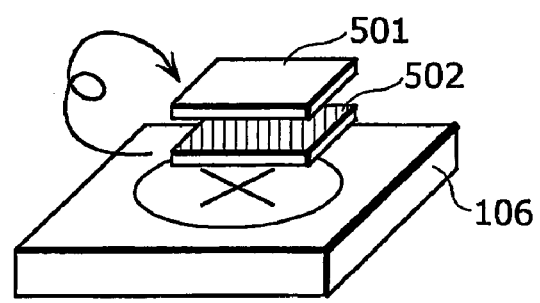
Figure 5C:
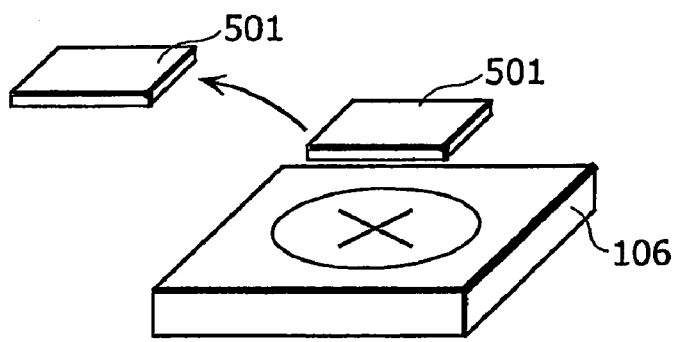
Figure 5D:
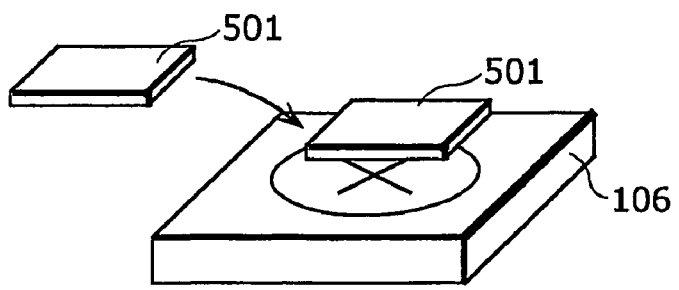

As shown in FIG. 5A, the user first passes the IC card over reader/writer 106, while facing back side 502 up. Next, as shown in FIG. 5B, the user turns the IC card upside down so as to switch back side 502 to front side 501. After that, as shown in FIG. 5C, the IC card is removed from a communication area of reader/writer 106. Then, as shown in FIG. 5D, while facing front side 501 up, the user passes the IC card over reader/writer 106.

Figure 5E:
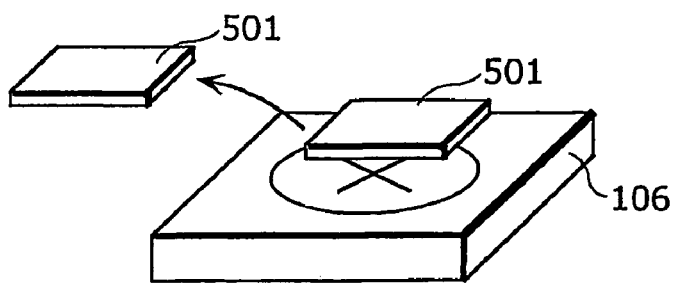

Thus, the user passes the IC card over reader/writer 106 in order of front side 501, back side 502 and back side 502. Consequently, a service is executed. The service execution procedure is described later. After the service is executed, as shown in FIG. 5E, the IC card is removed from the communication area of the reader/writer 106.

FIG. 6 is a drawing showing another usage pattern of the IC card according to the present invention. Here, in order to distinguish left side 503 and right side 504 of the IC card, left side 503 is indicated in a shaded area.

It should be noted that, hereafter, passing the IC card over reader/writer 106 so as to bring right side 504 of the IC card closer to reader/writer 106 than left side 503 is indicated that "passing right side 504 of the IC card over reader/writer 106." Also, passing the IC card over reader/writer 106 so as to bring left side 503 of the IC card closer than right side 504 of the IC card is indicated that "passing left side 503 of the IC card over reader/writer 106".

Figure 6A:
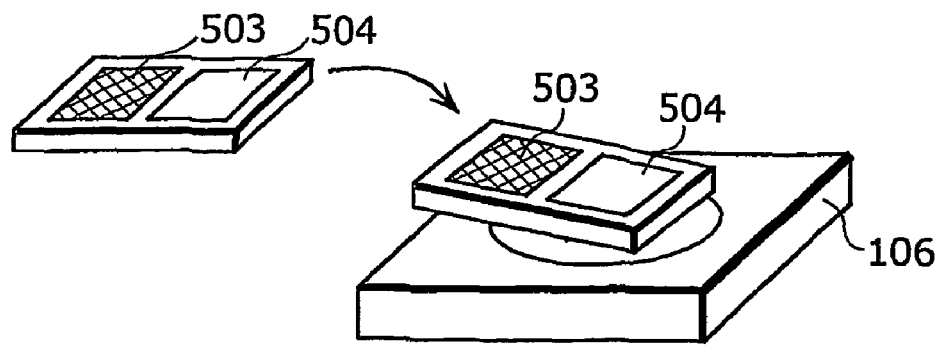
FIG. 6A, FIG. 6B, FIG. 6C and FIG. 6D are drawings showing another usage of the IC card according to the present invention.
Figure 6B:
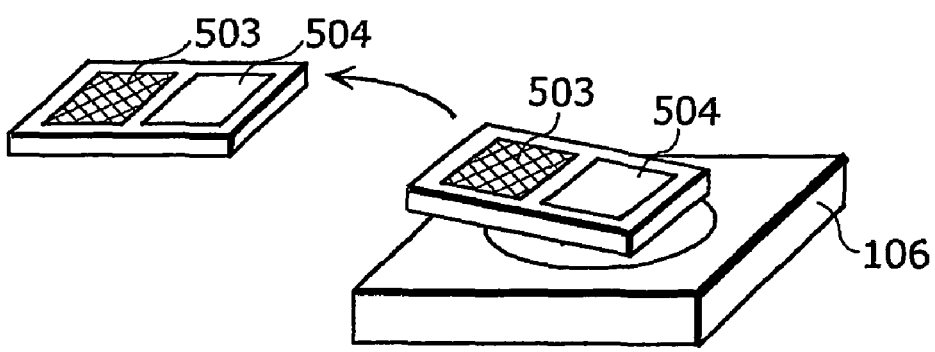
Figure 6C:
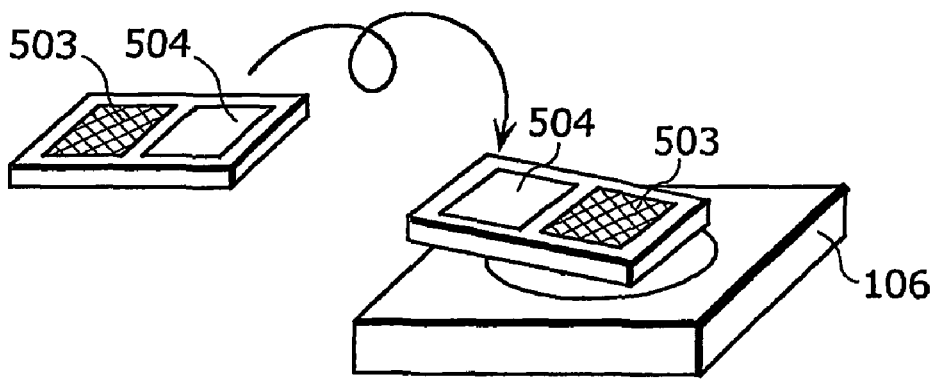

As shown in FIG. 6A, the user first passes right side 504 of the IC card over reader/writer 106. Next, as shown in FIG. 6B, the IC card is removed from a communication area of reader/writer 106. After that, as shown in FIG. 6C, the user passes left side 503 of the IC card over reader/writer 106.

Figure 6D:
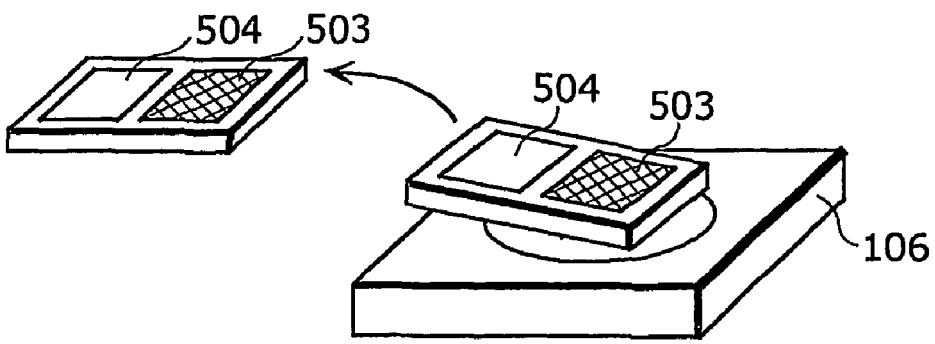

Thus, the user passes the IC card over reader/writer 106 in order of right side 504 and left side 503. Consequently, a service is executed. The service execution procedure is described later. After the service is executed, as shown in FIG. 6D, the IC card is removed from the communication area of the reader/writer 106.

FIG. 7 is a drawing showing another usage pattern of the IC card according to the present invention. That is, it is described an example of reader/writer 106 with one reading unit in FIGS. 5 and 6. On the other hand, as shown in FIGS. 7, the present invention is applicable to the case where reader/writer 106 has multiple reading units.

Here, it is indicated that the service is executed by the following procedure: as shown in FIG. 7A, front side 501 is first passed over left-side reading unit 106a; as shown in FIG. 7B, back side 502 is then passed over center-part reading unit 106b; and as shown in FIG. 7C, back side 502 is passed over right-side reading unit 106c. The order of passing the IC card over three reading units 106a, 106b and 106c are not particularly restricted. In other words, similar effect can be obtained regardless of the order unless front side 501 is passed over left-side reading unit 106a, back side 502 is passed over center-part reading unit 106b, and back side 502 is passed over right-side reading part 106c.

Figure 8:
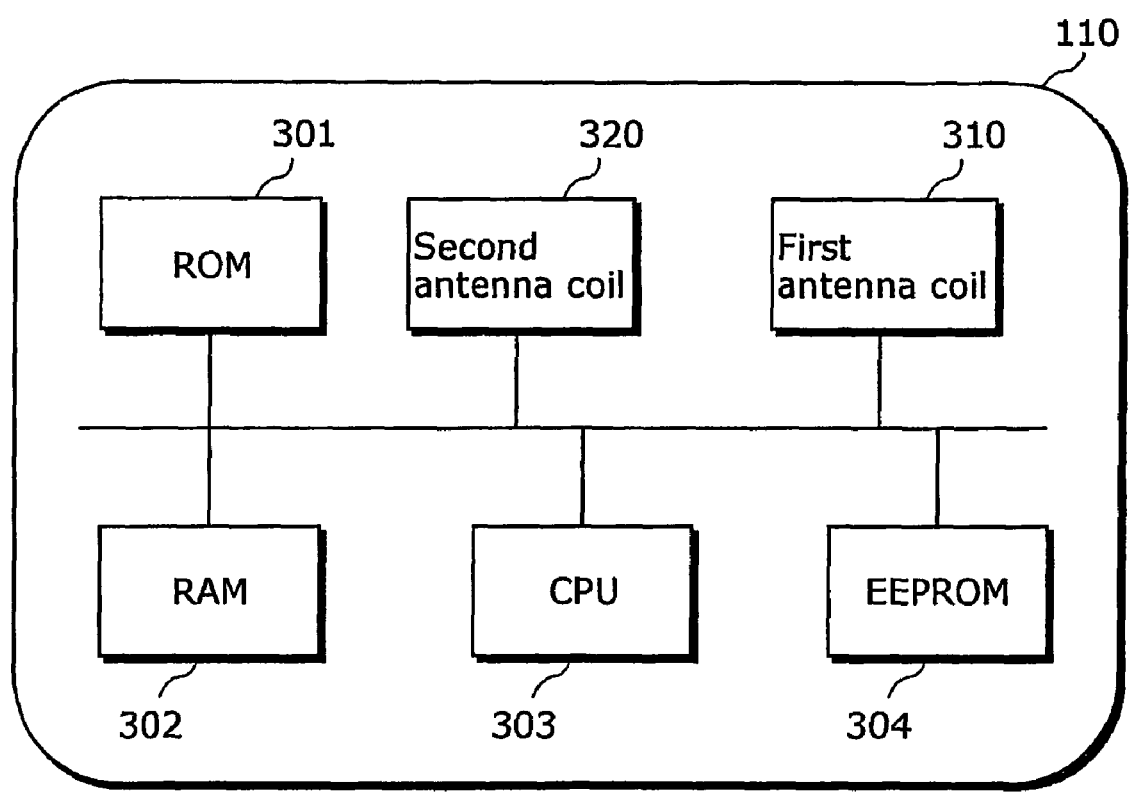
FIG. 8 is a diagram showing a hardware structure of the IC card according to the present invention.

FIG. 8 is a diagram showing a hardware structure of the IC card according to the present invention. IC card 110 can obtain an access direction type in which IC card 110 is passed over the reader/writer, by having antenna coils 310 and 320. The structure other than that (including ROM 301, RAM 302, CPU 303 and EEPROM 304) is same as a general IC card.

The access direction type includes both of an access side type and a horizontal access direction type. The access side type is specifically front or back side of IC card 110. The horizontal access direction type is directions of horizontal access on the same side of IC card 110. Specifically, the access direction type indicates one of right, left, front and back sides of IC card 110, or a combination of these sides.

Hereafter, it is described in detail about technology of detecting access side type or horizontal access direction type.

FIG. 9 is a functional block diagram of the IC card according to the present invention. IC card 110 includes first electromotive force measurement unit 311, second electromotive force measurement unit 312, electromotive comparing unit 313, direction obtainment unit 707. First electromotive force measurement unit 311 measures electromotive force generated by first antenna coil 310. Second electromotive force measurement unit 312 measures electromotive force generated by second antenna coil 320. Electromotive force comparing unit 313 compares characteristics of the electromotive forces measured by first and second electromotive force measurement units 311 and 312. Direction obtainment unit 707 detects access side type or horizontal access direction type of IC card 110 which accesses the reader/writer, based on the comparison result obtained from electromotive force comparing unit 313.

Figure 10A:
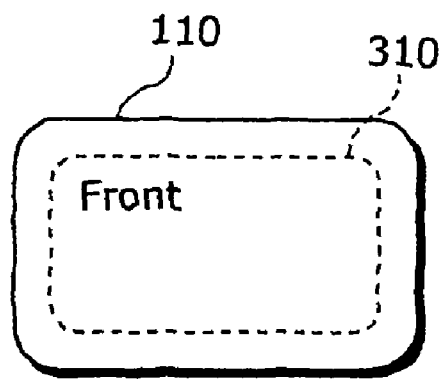
FIG. 10A is a plain view showing an appearance of a front side of an IC card having multiple antenna coils.
Figure 10B:
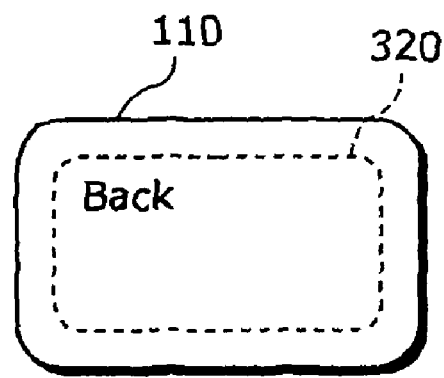
FIG. 10B is a plain view showing an appearance of a back side of the IC card.

FIG. 10A is a plain view showing an appearance of a front side of an IC card having multiple antenna coils. FIG. 10B is a plain view showing the appearance of a back side of the IC card. IC card 110 has a first antenna coil 310 on the front side and a second antenna coil 320 on the back side.

Figure 10C:
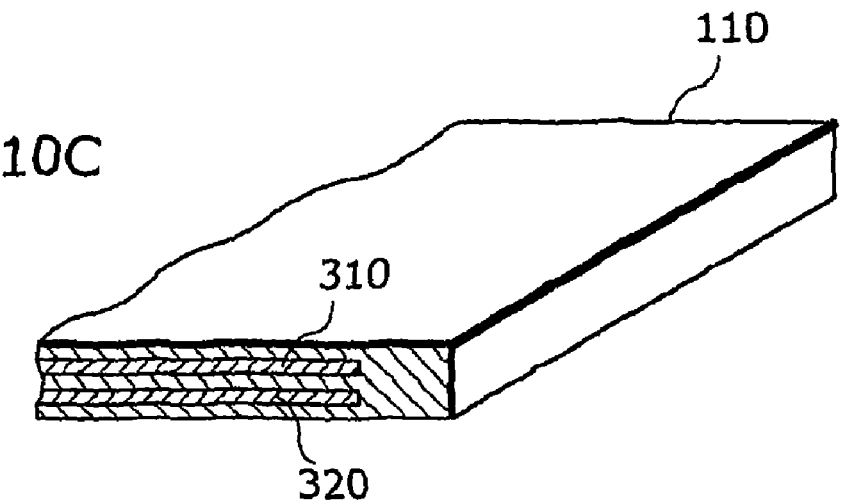
FIG. 10C is a perspective sectional view of a portion of the IC card.

FIG. 10C is a perspective sectional view of a portion of the IC card. In IC card 110, second antenna coil 320 is laid in a position deeper than that of the first antenna coil 310 so that the first antenna coil 310 is laid just above the second antenna coil 320. While it is not shown in the drawing, it should be noted that an integrated circuit chip in which RAM 302, CPU 303 and the like are built is surely embedded in the IC card.

Figure 11A:
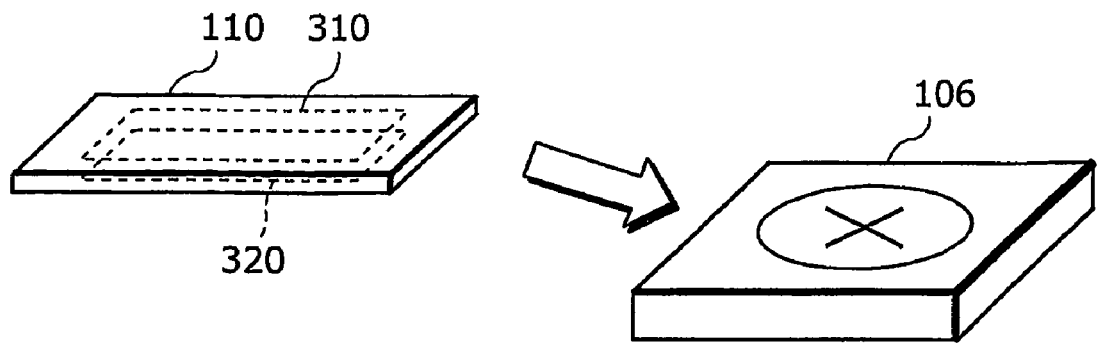
FIG. 11A is a diagram for describing a method of operating the IC card according to the present invention.

FIG. 11A is a drawing for describing a method of operating the IC card according to the present invention. The user first passes IC card 110 with the side of second antenna coil 320 facing the reader/writer 106 (IC card 110 is passed over reader/writer 106 in a direction indicated by an arrow). Consequently, electromagnetic wave emitted from reader/writer 106 is received by first antenna coil 310 and second antenna coil 320 in IC card 110. The electromotive forces are generated respectively by first antenna coil 310 and second antenna coil 320. The generated electromotive forces are measured respectively by first electromotive force measurement unit 311 and second electromotive force measurement unit 312. The measured electromotive forces are then compared by electromotive force comparing unit 313.

Figure 11B:
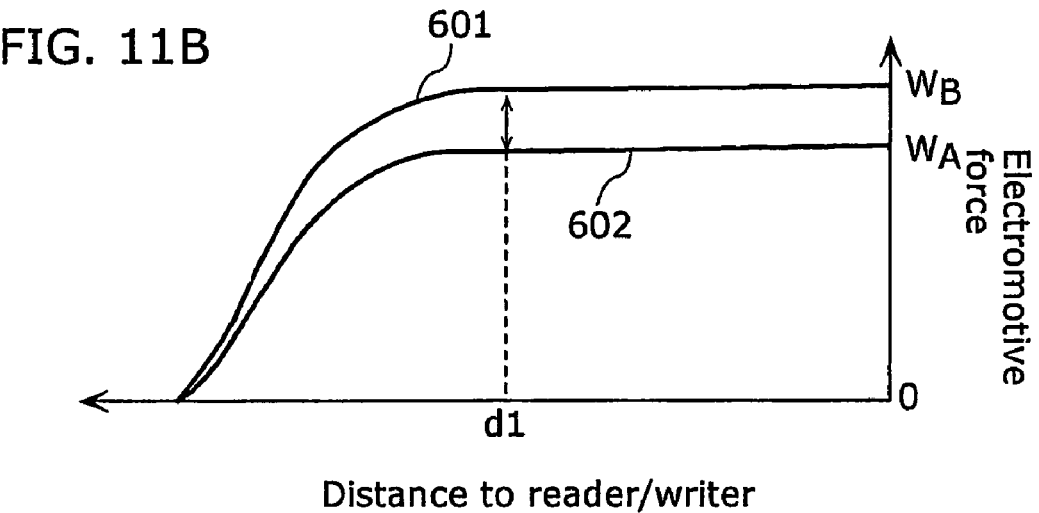
FIG. 11B is a diagram showing a relationship between a distance from the IC card to the reader/writer and electromotive forces generated by respective antenna coils.

FIG. 11B is a diagram showing the relationship between the distance from the IC card to the reader/writer, and electromotive forces generated by the respective antenna coils. In this diagram, waveform 602 indicates a transition of the electromotive force generated by first antenna coil along the distance and waveform 601 indicates the electromotive force generated by second antenna coil 320 along the distance. Here, a given distance between IC card 110 and reader/writer 106 is presumed as d1. Then, if the electromotive force generated by first antenna coil 310 in the predetermined distance d1 is presented by WA, and the electromotive force generated by second antenna coil 320 is similarly presented by WB, WB is greater than WA. That is, second antenna coil 320 which is closer to reader/writer 106 generates larger electromotive force than first antenna coil 310. Accordingly, direction obtainment unit 717 detects that the IC card with the side of second antenna coil 320 (back side) facing reader/writer 106.

Figure 11C:
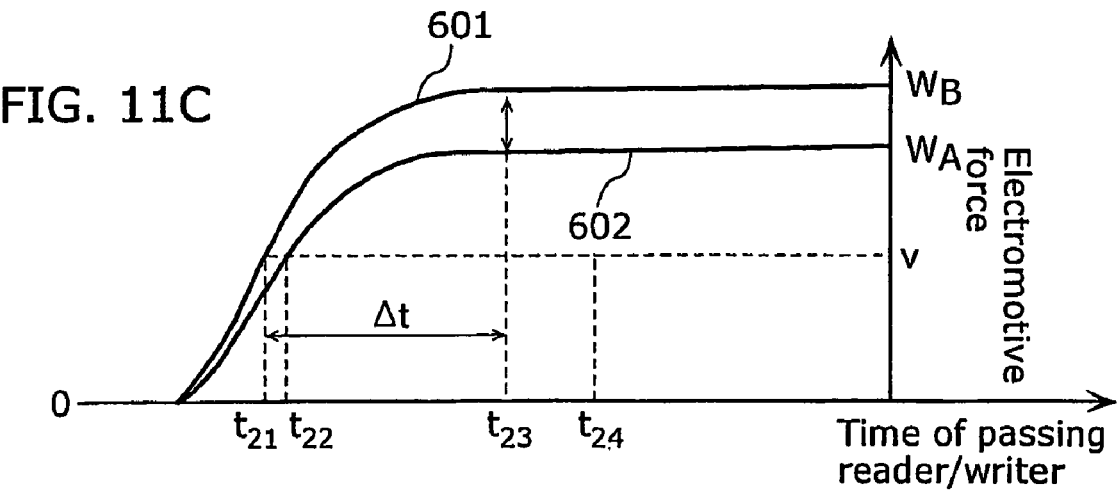
FIG. 11C is a diagram showing a relationship between time when the IC card passes the reader/writer and electromotive forces generated by respective antenna coils.

FIG. 11C is a diagram showing a relationship between time when the IC card passes the reader/writer (or time when it approaches the reader/writer) and electromotive forces generated by respective antenna coils. Similarly, waveform 602 indicates a transition of the electromotive force generated by first antenna coil 310, and waveform 601 indicates a transition of electromotive force generated by second antenna coil 320.

Here, time t21 is detected, which is when the electromotive force generated by one of first antenna coil 310 and second antenna coil 320 exceeds a predetermined voltage v. If the electromotive force generated by first antenna coil 310 at time t23 when a predetermined time has passed from time t21 is then indicated as WA, and the electromotive force generated by second antenna coil 320 is indicated as WB, WB is greater than WA. In other words, second antenna coil 320 which is closer to reader/writer 106 generates larger electromotive forces than first antenna coil 310. Accordingly, direction obtainment unit 707 detects that a side of the IC card having second antenna coil 320 (back side) is passed over reader/writer 106.

Here, time 23 may be time from time t21 until predetermined time Δt is elapsed. Note that, predetermined time Δt can be an arbitral time until the electromotive force generated by second antenna coil 320 (the antenna coil generated electromotive force which exceeds v at first) reaches the first local maximum.

It should be noted that "v" shown in following FIG. 12B, FIG. 12C, FIG. 14A and FIG. 14B also indicates "predetermined voltage v" as described in FIG. 11C.

Thus, the IC card according to the present invention has antenna coils respectively on front and back sides. Therefore, an access side type of the IC card which is passed facing the reader/writer can be detected.

It should be noted that, in the description of FIG. 11B, a horizontal axis indicates "a distance to the reader/writer", but it may be "a time when the IC card passes (or approaches) the reader/writer" instead. This is because the distance from the IC card to the reader/writer can be replaced with the time when the IC card passes (or approaches) the reader/writer.

Figure 12A:
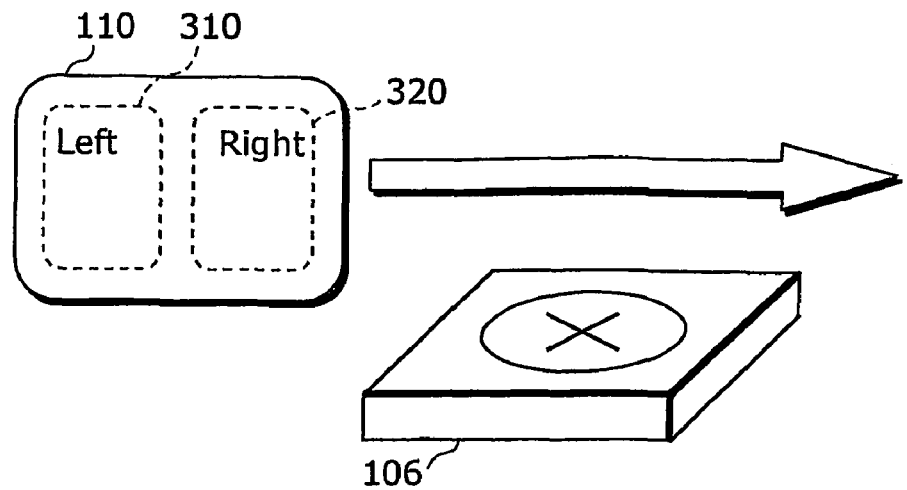
FIG. 12A is a diagram for describing another operational method of the IC card according to the present invention.

FIG. 12A is a drawing for describing another method of operating the IC card according to the present invention. IC card 110 has first antenna coil 310 at the left beneath one side of IC card 110, and second antenna coil 320 at the right beneath the same side. Here, the user passes IC card 110 over reader/writer 106 from the right side in which second antenna coil 320 is laid. The electromotive forces generated are measured respectively by first electromotive force measurement unit 311 and second electromotive force measurement unit 312. The measured electromotive forces are then compared by electromotive force comparing unit 313.

Figure 12B:
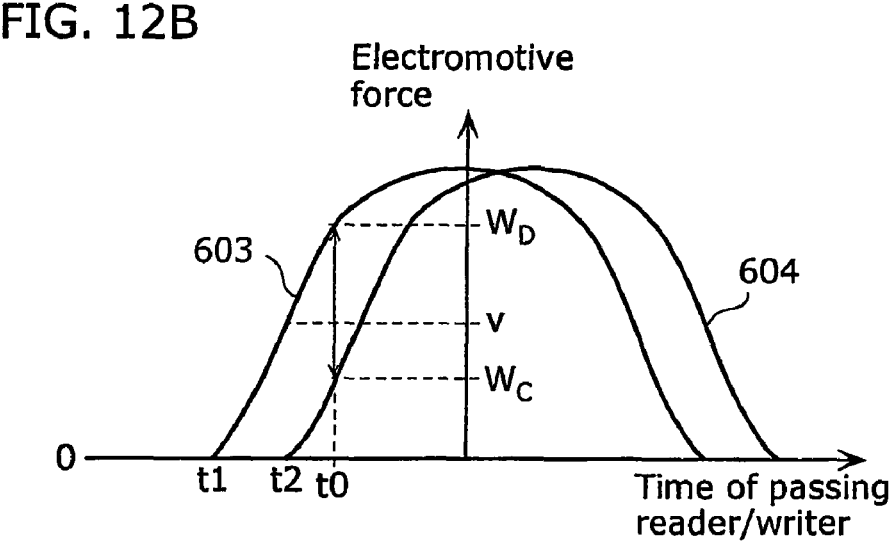
FIG. 12B is a diagram showing a relationship between time when the IC card passes the reader/writer and electromotive forces generated by respective antenna coils.

FIG. 12B is a diagram showing the relationship between the time when the IC card passes over the reader/writer and the electromotive forces generated by the respective antenna coils. In the diagram, waveform 604 indicates a transition of the electromotive force generated by first antenna coil 310 while waveform 603 indicates a transition of the electromotive force generated by second antenna coil. Here, a predetermined time when IC card 110 passes over reader/writer 106 is presumed as t0. Then, if the electromotive force generated by first antenna coil 310 at the predetermined elapsed time t0 is presented by WC and the electromotive force generated by second antenna coil 320 is similarly presented by WD, WD is greater than WC. That is, at the predetermined elapsed time t0, second antenna coil 320 which firstly approaches reader/writer 106 generates larger electromotive force than first antenna coil 310. Accordingly, direction obtainment unit 707 detects that IC card 110 with a side of second antenna coil 320 (right side) is firstly passed over reader/writer 106.

Here, the predetermined elapsed time t0 may be defined as a time when a predetermined time (e.g. 100 msec) is elapsed after a first time t1 when the electromotive force is generated by second antenna coil 320 (antenna coil which firstly generated electromotive force), or as a time when a predetermined time (e.g. 10 msec) is elapsed after a second time t2 when the electromotive force is generated by first antenna coil 310 (antenna coil which secondly generated electromotive force). Note that a predetermined time may be an arbitral time taken for the electromotive force generated by the antenna coil which firstly generated the electromotive force reaches the first local maximum.

Further, a basis of a comparison between first antenna coil 310 and second antenna coil 320 is not limited to the predetermined elapsed time t0. For example, after detecting the generation of first electromotive force by second antenna coil 320, electromotive force comparing unit 313 may output, to direction obtainment unit 707, information indicating that the antenna coil which firstly generated the electromotive force is second antenna coil 320, at the point when next generation of the electromotive force by first antenna coil 310 is detected.

Figure 12C:
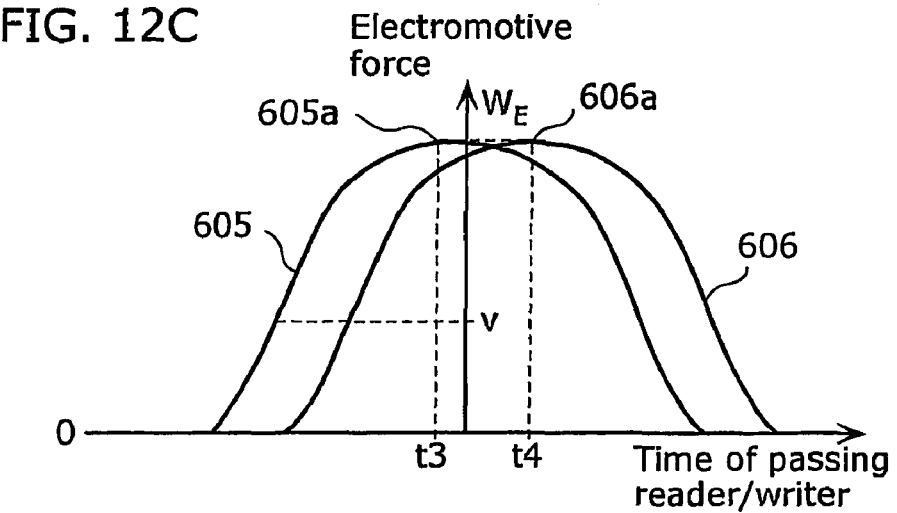
FIG. 12C is a diagram showing a relationship between time when the IC card passes the reader/writer and first local maximums of the electromotive forces generated by respective antenna coils.

FIG. 12C is a diagram showing the relationship between the time when the IC card passes over the reader/writer and the first local maximums of the electromotive forces generated by the respective antenna coils. In the diagram, waveform 606 indicates a transition of the electromotive force generated by first antenna coil 310 while waveform 605 indicates a transition of the electromotive force generated by second antenna coil 320. Here, the first local maximums of the electromotive forces generated by respective antenna coils are indicated as WE. Accordingly, the time t3 taken for the electromotive force generated by second antenna coil 320 to reach the first local maximum 605a comes earlier than the time t4 taken for the electromotive force generated by first antenna coil 310 to reach the first local maximum 606a. Accordingly, in this case, electromotive force comparing unit 313 outputs, to direction obtainment unit 707, the information indicating that the antenna coil of which the electromotive force is reached its first local maximum is second antenna coil 320.

Thus, the comparison may be made based on which one of the electromotive forces respectively generated by first antenna coil 310 and second antenna coil 320 firstly reaches the first local maximum. That is, the basis of comparing the electromotive force of first antenna coil 310 and the electromotive force of second antenna coil 320 varies and is not particularly restricted.

Thus, the IC card according to the present invention has antenna coils on the left and right sides of one face of the IC card so that a horizontal access direction type of the IC card which is passed over the reader/writer can be detected.

Figure 13A:
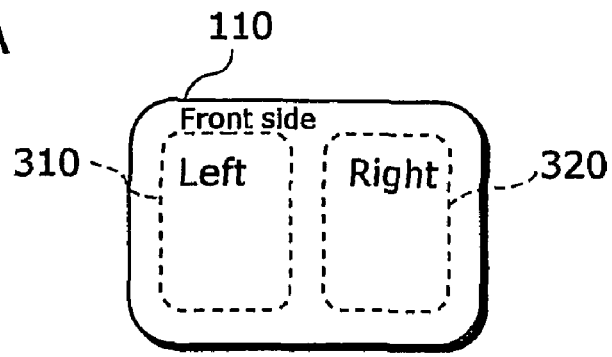
FIG. 13A is a plain view showing an appearance of a front side of another IC card according to the present invention.
Figure 13B:
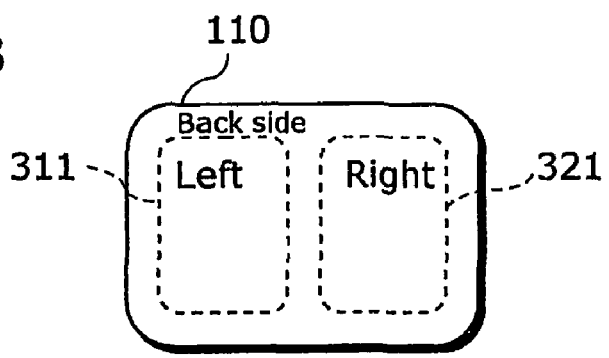
FIG. 13B is a plain view showing an appearance of a back side of the IC card.

FIG. 13A is a plain view showing the appearance of a front side of another IC card according to the present invention. FIG. 13B is a plain view showing the appearance of a back side of the IC card. Here, in the IC card, first antenna coil 310 is laid at the left side beneath the surface of the front side of the IC card and second antenna coil 320 is laid at the right side. Further, it has third antenna coil 311 laid at the left side beneath the surface of the back side and fourth antenna coil 321 laid at the right side.

Figure 13C:
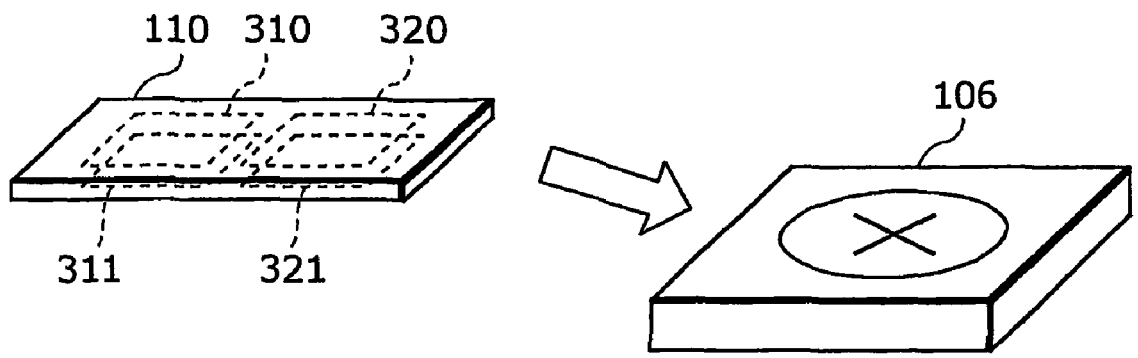
FIG. 13C is a drawing for describing an operational method of the IC card.

FIG. 13C is a drawing for describing the method of operating the IC card. Here, the user passes IC card 110 over reader/writer 106 starting with the right side of the back side beneath where fourth antenna coil 321 is laid. The electromotive forces generated by the respective antenna coils are measured respectively by corresponding electromotive force measurement units. The measured electromotive forces are compared by electromotive force comparing unit 313.

That is, electromotive force comparing unit 313 compares the electromotive force generated by first antenna coil 310 or third antenna coil 311 that is laid beneath the left side of the IC card 110 and the electromotive force of second antenna coil 320 or fourth antenna coil 321 that is laid on the right side of the IC card 110. Here, as described before, the generation time of the electromotive force and the like are compared. Using the example shown in FIG. 13C, it is judged that the electromotive force of the antenna coil laid beneath the right side of the IC card 110 is larger.

After that, electromotive force comparing unit 313 compares the electromotive force generated by second antenna coil 320 laid beneath the surface of the front side of IC card 110 to the electromotive force generated by fourth antenna coil 321 laid beneath the surface of the back side. Here, as described before, the amount of electromotive force is compared. Using the example shown in FIG. 13, it is judged that the electromotive force of the antenna coil laid beneath the surface of the back side of IC card 110 is larger.

As the result, electromotive force comparing unit 313 judges that the electromotive force generated by fourth antenna coil 321 is the largest. Accordingly, direction obtainment unit 707 detects that the IC card is passed over reader/writer 106 from the side in which forth antenna coil 321 is laid (right on the back side).

Thus, the IC card according to the present invention has two antenna coils beneath the surfaces of each of the front and back sides so that an access side type and a horizontal access direction type of the IC card which is passed over the reader/writer can be detected.

It should be noted that here shows the example of comparing the electromotive force between the front and the back sides after comparing electromotive forces on the left and right sides of IC card 110. However, the order of procedure can be reversed. That is, the electromotive forces of the left and right sides may be performed after comparing the electromotive forces on the front and back sides of IC card 110.

By the way, in FIG. 5A, it is described a case where the IC card is passed over reader/writer 106 in an order of front side 501, back side 502, and back side 502. In this case, it is necessary to detect that front side 501 is changed to back side 502 and that back side 502 is continuously passed twice over reader/writer 106.

Figure 14A:
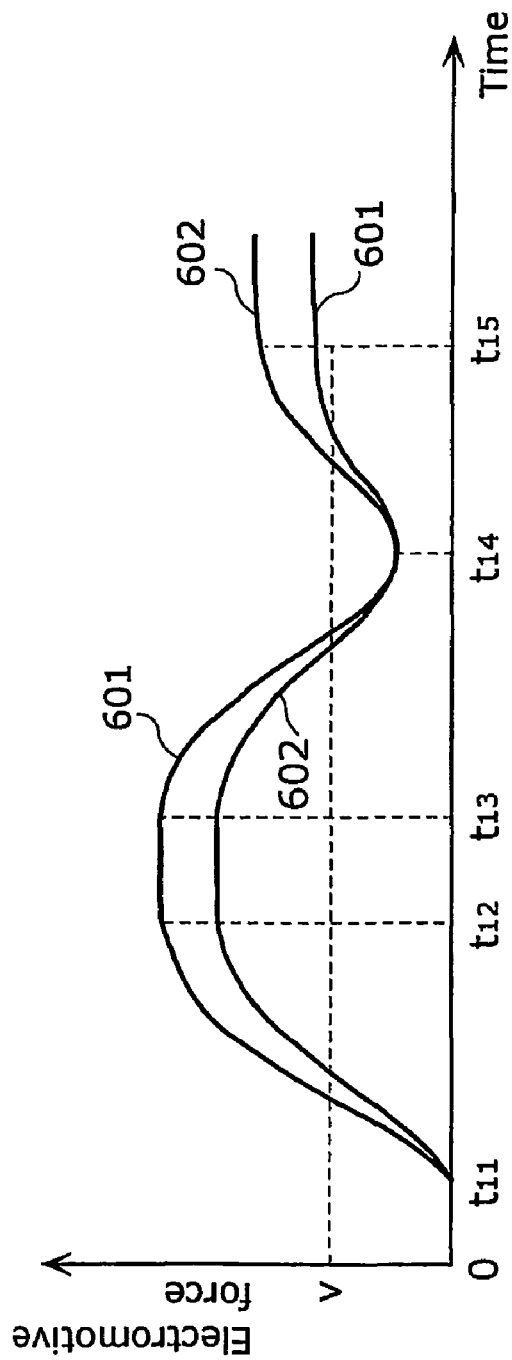
FIG. 14A is a diagram showing electromotive forces generated by respective antenna coils when the IC card is switched from the front side to the back side.

FIG. 14A is a diagram showing electromotive forces generated by respective antenna coils when front side 501 is changed to back side 502. In this diagram, waveform 601 indicates a transition of the electromotive force generated by first antenna coil 310 which is laid beneath the surface of front side 501, and waveform 602 indicates a transition of the electromotive force generated by second antenna coil 320 which is laid beneath the surface of back side 502.

First, the user passes the IC card over reader/writer 106 while facing back side 502 up. The electromotive force waveform from time t11 when the IC card is started to be passed as described to time t12 when the passing is finished is as previously described. That is, first antenna coil 310 (waveform 601) which is closer to reader/writer 106 generates larger electromotive force than second antenna coil 320 (waveform 602).

Next, the user switches back side 502 and front side 501 by reversing the IC card. The electromotive forces generated by both antenna coils start decreasing starting at time t13 when the IC card is started to be reversed as described. The electromotive forces generated by both antenna coils then become a smaller value than the predetermined voltage v at time t14 when the IC card is vertical to reader/writer 106. Further, at time t15 when the IC card was reversed, second antenna coil 320 (waveform 602) which is closer to reader/writer 106) generates larger electromotive force than first antenna coil 310 (waveform 601).

Figure 14B:
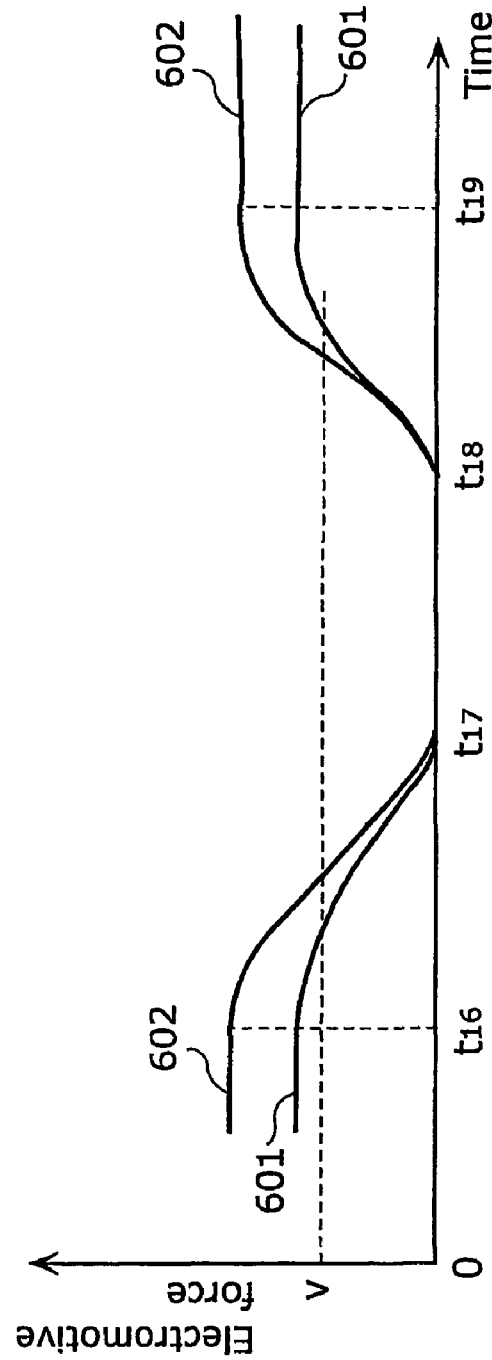
FIG. 14B is a diagram showing electromotive forces generated by respective antenna coil when the back side of the IC card is passed over the reader/writer twice.

FIG. 14B is a diagram showing electromotive forces generated by respective antenna coils when back side 502 is continuously passed twice. Also in this diagram, waveform 501 indicates a transition of the electromotive force generated by first antenna coil 310 which is laid beneath the surface of the front side 501, and waveform 602 indicates a transition of the electromotive force generated by second antenna coil 320 which is laid beneath the surface of the back side 502.

Here, it starts describing from a state where the back side 502 has been passed over reader/writer 106. That is, the user removes the IC card of which back side 502 is facing downward from a communication area of reader/writer 106. The electromotive forces generated by both antenna coils start decreasing at time t16 when the IC card is started taking away from reader/writer 106. Then, at time t17 when the IC card is removed from the communication area of reader/writer 106, the electromotive forces generated by respective antenna coils become 0.

Next, the user passes the IC card over reader/writer 106, while facing front side 501 up. The electromotive forces generated by respective antenna coils starts increasing at time t18 when the IC card starts passing over reader/writer 106. Then, at time t19 when the IC card is finished passing over reader/writer 106, as in original, second antenna coil 320 (waveform 602) closer to reader/writer 106 generates larger electromotive force than first antenna coil 310 (waveform 601).

Thus, when front side 501 is changed to back side 502 or when back side 502 is continuously passed over the reader/writer twice, there are moments when the electromotive forces generated by respective antenna coils is less than the predetermined voltage v. When it is detected that the electromotive forces are less than the predetermined voltage v, the electromotive forces generated by the respective antenna coils are compared using a method described in FIG. 11C. Therefore, it can be detected that front side 501 is changed to back side 502 and that back side 502 is continuously passed over the reader/writer twice.

Figure 15:
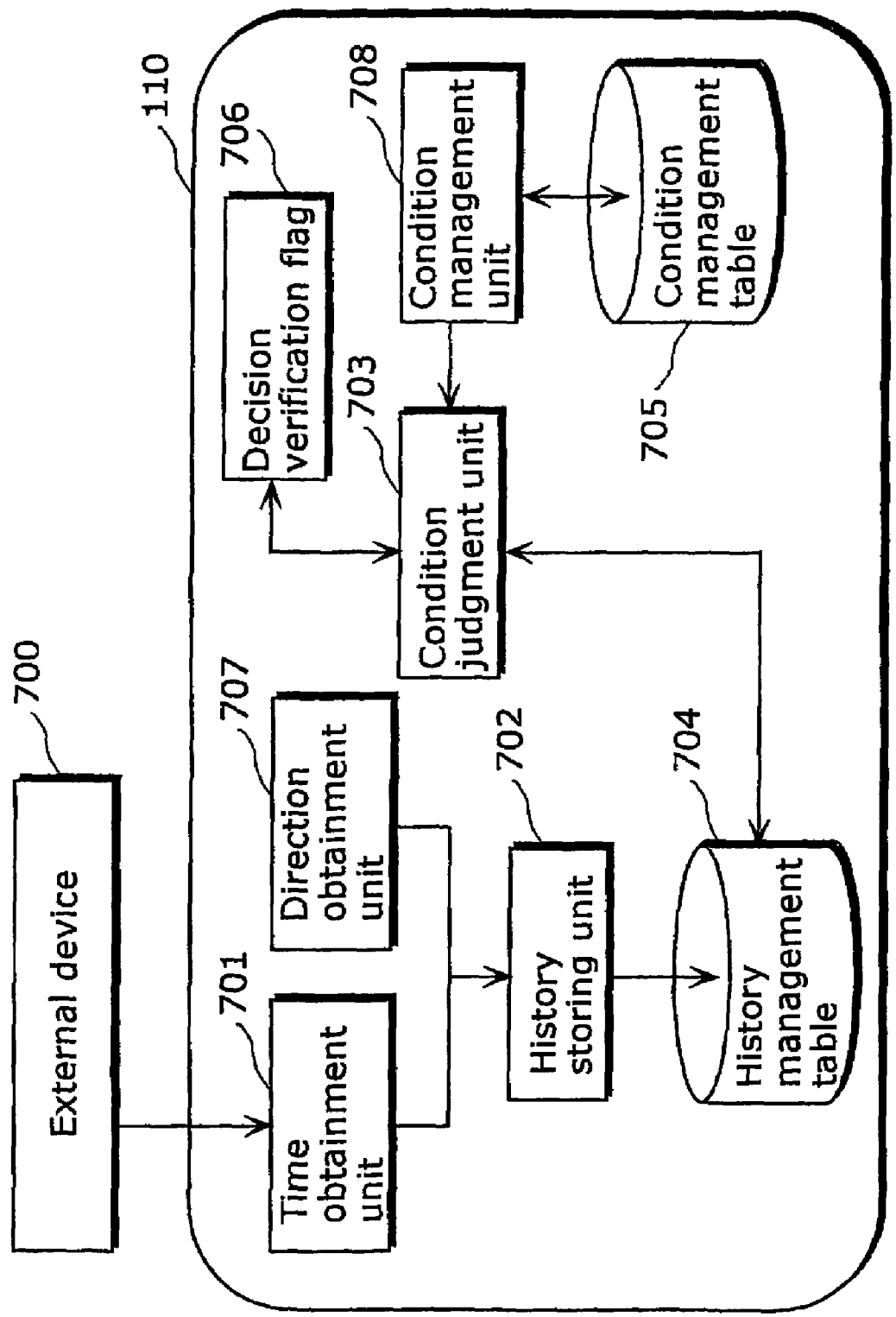
FIG. 15 is a diagram showing a software structure of the IC card according to the present invention.

FIG. 15 is a diagram showing a software structure of the IC card according to the present invention. While the fundamental software structure is same as the general IC card (FIG. 3), it differs from the general IC card in that it has time obtainment unit 701, history storing unit 702, condition judgment unit 703 and direction obtainment unit 707.

Direction obtainment unit 707 obtains an access direction type (access side type and horizontal access direction type) in which the IC card is passed over the reader/writer. As a structure for obtaining the access side type and the horizontal access direction type, as described before, a structure which has multiple antenna coils, electromotive force measurement units and electromotive force comparing units can be adopted. Not to mention that the access side type and horizontal access direction type of the IC card may be obtained using another technique.

Time obtainment unit 701 obtains time when IC card 110 accesses reader/writer 106. The access time can be obtained by a command from EC server 100 and reader/writer 106 that are external devices 700, or from portable device 107.

History storing unit 702 stores access history into history management table 704 in a nonvolatile memory such as EEPROM 304. The access history includes an application program ID (service ID), an access direction type obtained by direction obtainment unit 707 (access side type and horizontal access direction type), and access time obtained by time obtainment unit 701.

Condition judgment unit 703 judges whether or not the access history satisfies an access condition. Specifically, it compares the access direction type obtained by direction obtainment unit 707 with the access direction type included in the access condition which has been stored in condition management unit 708, and judges whether or not they match. The access condition is information indicating a condition for which the IC card 110 accesses reader/writer 106, and is stored in condition management table 705 that is described later.

FIG. 16 is a table showing an internal structure of the history management table. History management table 704 stores service type 810, application program ID 820 which corresponds to the service, and access state 830. Access state 830 includes access time 831 and access direction 832.

Here, it is described an example when the user tried accessing twice for executing E_SRV1. Specifically, as the first record, access history 840 for the first time is stored, and as the second record, access history 840 for the second time is stored.

First, first access history 840 is described. Service type 810 is "E_SRV1". Application program ID 820 is "0001h" which indicates an application program ID corresponding to E_SRV1. Access time 831 is "07D5h, 03h, 03h, 0Ch, 18h, 37h" which indicates twelve o'clock twenty-four minutes and fifty-five seconds on Mar. 3, 2004. Access direction 832 is "88h" which indicates front side downward of the IC card.

Next, second access history 841 is described. Similar to first access history 840, service type 810 is "E_SRV1" and application program ID 820 is "0001h". Access time 831 is "07D5h, 03h, 03h, 0Ch, 18h, 38h" which indicates twelve o'clock twenty-four minutes and fifty-six seconds on Mar. 3, 2004. Access direction 832 is "94h" which indicates back side downward of the IC card.

It should be noted that, while there are the condition management table 705 in which access conditions are stored and the condition management unit 708 which manages the condition management table 705 in here, the two constituents can be one constituent. That is, the similar effect can be obtained even if the condition management unit 708 stores and manages the access conditions.

FIG. 17 is a table showing, in detail, indications of values of the access direction. Access direction 832 is indicated in a number of 1 byte. Hereafter, it is described about what is indicated by each bit value.

First, high-ordered two bits of b8 and b7 are bits for setting front-back verification flag. That is, when the most significant bit of b8 is 1, the IC card is dealt with by distinguishing the front and back sides. The front and back sides of the IC card can be judged with the value of bit b5. On the other hand, when the most significant bit of b8 is 0, the front and back sides of the IC card is not distinguished. In this case, for example, a first access side is considered as side 1 and next access side is considered as side 2. The bit b7 is a reserve and 0 is set for default.

Next two bits 1101 are bits for indicating front side or back side of the IC card. That is, when the bit b5 is 0, it indicates that the IC card faces the front side. When the bit b5 is 1, it indicates that the IC card faces the back side. The bit b6 is a reserve and 0 is set for default.

Further, the lower-ordered 4 bits are bits for indicating a direction in which the IC card accesses the reader/writer. That is, when the high-ordered bit b4 (1102) is 1, it is indicated that the upper side of the IC card is accessed. When the next bit b3 (1103) is 1, it is indicated that the bottom side of the IC card is accessed. When the next bit b2 (1104) is 1, it is indicated that the left side of the IC card is accessed. When the next bit b1 (1105) is 1, it is indicated that the right side of the IC card is accessed.

FIG. 18 is a table showing an internal structure of the condition management table. Here, it is shown an example where multiple services E_SRV1 to E_SRVn exist in an IC card.

Condition management table 705 includes service type 1200, application program ID 1201 corresponding to the service, and access condition 1202 for executing the service. Access condition 1202 includes comparison times 1203, time limit 1204, and time series pattern 1205.

Comparison times 1203 is a number of comparisons of the access direction types. Time limit 1204 is a limit of time for the IC card to access the reader/writer. Time series pattern 1205 is a time series pattern of the access direction types, and the value similarly indicates the value of access direction 832 in history management table 704.

For further details, access condition 1210 of service type E_SRV1 is described as an example. The application program ID is "0001h" which indicates an application program ID corresponding to E_SRV1. Comparison times 1203 is "02h" which indicates twice. Time limit 1204 is "04h" which indicates four seconds. Time series pattern 1205 is "80h, 94h" which respectively indicates the first access direction is front side and the second access direction is back side downward. In other words, when the IC card is passed over the reader/writer within four seconds in order of front side and back side downward, the application program with the ID "0001h" and E_SRV1 can be received.

Figure 19:
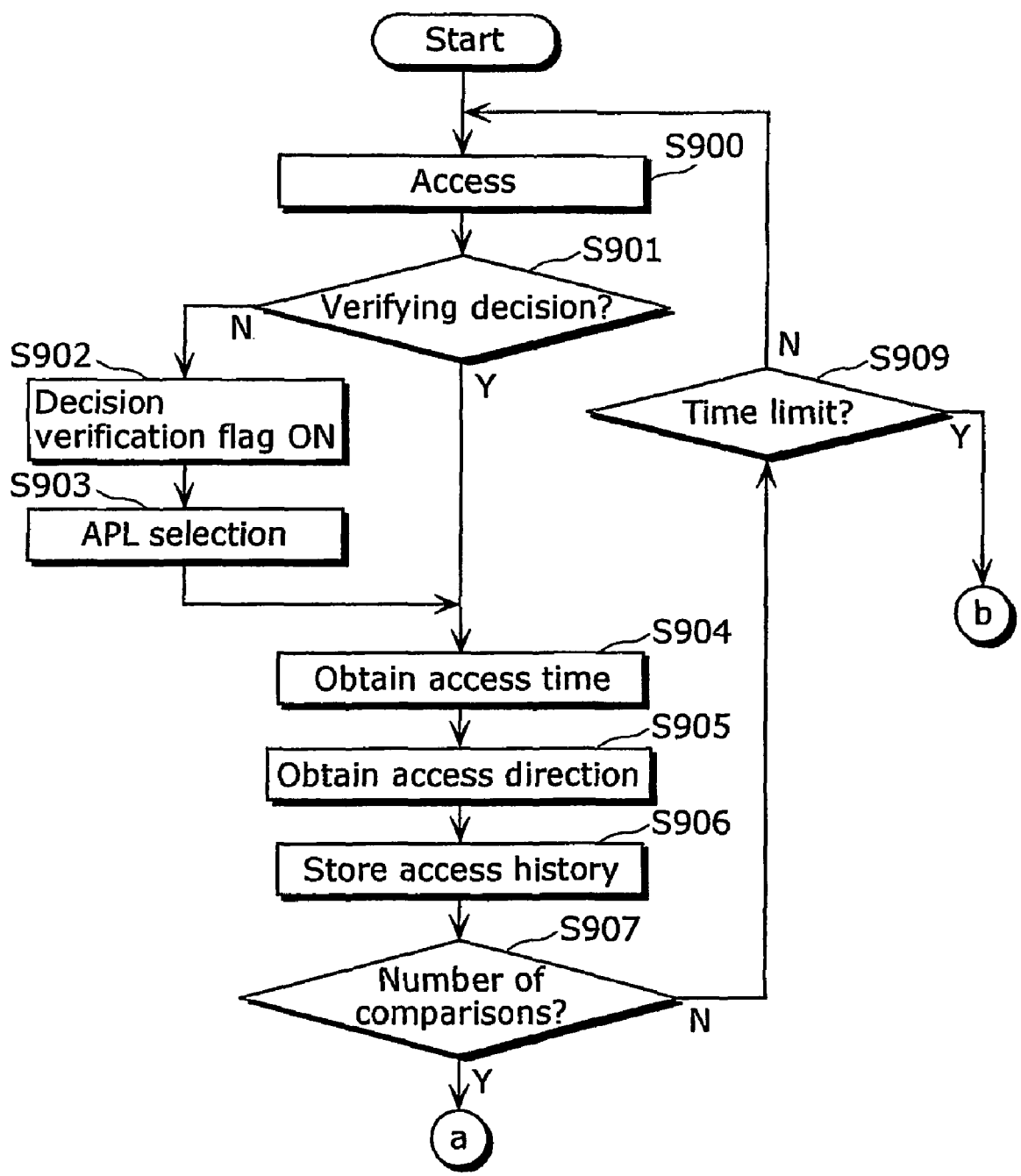
FIG. 19 is a flowchart showing a service execution procedure in the first embodiment.
Figure 20:
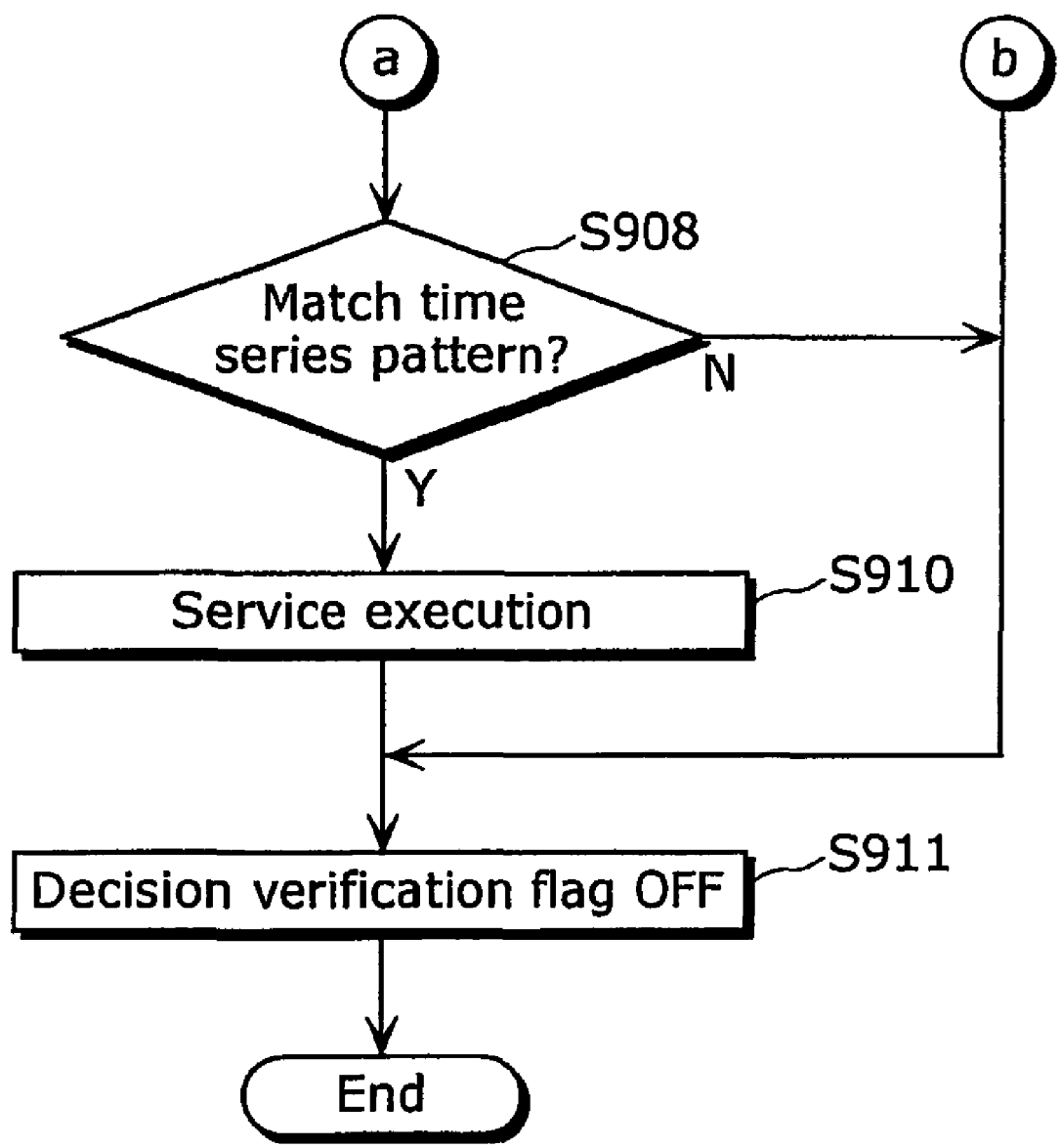
FIG. 20 is a flowchart showing a service execution procedure in the first embodiment.

FIGS. 19 and 20 are flowcharts showing service execution procedure according to the first embodiment. Hereafter, with references to FIGS. 19 and 20, an operation of the IC card in the first embodiment is described in detail.

First, by passing the IC card over the reader/writer, the IC card is accessed to the reader/writer (step S900). Accordingly, condition judgment unit 703 receives a command from the reader/writer, and judges whether or not the user is verifying the decision (step S901).

Here, "whether or not the user is verifying the decision" means whether or not the access is the first access, specifically about whether or not decision verification flag 706 is OFF (refer to FIG. 15). Furthermore, the first access is the first access from among series of accesses necessary for executing a predetermined application program.

Consequently, when decision verification flag 706 is OFF (N in step S901), condition judgment unit 703 judges that the current access is the first access, and turns decision verification flag 706 ON (step S902). Further, condition management unit 708 selects one of APL_ID 1201 from condition management table 705 (step S903).

Here, the APL_ID 1201 to be selected is an application program which the user wishes to execute. While the method of realizing the selection is not particularly limited, for example, the user may specify to the reader/writer that the user wants to execute the desired service. Accordingly, APL_ID 1201 corresponding to a service type specified by the user can be selected. When the reader/writer corresponds only to a single service, the user of course does not need to specify to the reader/writer that the user wants to execute the desired service.

On the other hand, when the decision verification flag is ON (Y in step S901), condition judgment unit 703 judges that the current access is not the first-access but on the way of the series of accesses. In this case, one APL_ID 1201 has been already selected so that special processing is not performed.

Next, time obtainment unit 701 obtains a command transmitted from the reader/writer, and an access time from a portable device and the like (step S904). In addition, direction obtainment unit 707 obtains an access direction of the IC card from electromotive force comparing unit 313 and the like (step S905). History storing unit 702 then stores a pair of the access time and access direction as an access history into management table 704 (step S906).

As described in the above, condition management unit 708 which has selected one APL_ID 1201 reads out an access condition corresponding to the APL_ID 1201 from the condition management table 705, and transmits it to condition judgment unit 703.

Accordingly, condition judgment unit 703 reads out the access history from history management table 704. It then judges whether or not the number of times when the IC card accesses the reader/writer reaches the comparison times (step S907). That is, it judges current number of access times based on the access history, and judges whether or not the number of accesses matches the comparison times 1203 which is included in the access condition.

Consequently, the condition judgment unit 703 repeats the operation from step S900 to step S907 if the number of accesses has not reached the comparison times (N in step S907). On the other hand, if it has reached the comparison times (Y in step S907), it judges whether or not the access direction satisfies the access condition (step S908). Specifically, it compares the access direction 832 included in the access history with time series pattern 1205 included in the access condition, and judges whether or not they matches with each other.

Therefore, the condition judgment unit 703 executes the service (step S910) if the access direction satisfies the access condition (Y in step S908), and turns decision verification flag 706 OFF (step S911). On the other hand, when the access direction does not satisfy the access condition (N in step S908), it turns decision verification flag 706 OFF without executing the service (step S911).

It should be noted that it is desired to have a step of judging whether or not it is reached a time limit between step S907 and step S900. That is, condition judgment unit 703 makes a user continue verifying the decision in the case where the time until the comparisons as many as the number of comparisons 1203 are completed has not reached the time limit (N in step S909) by counting from the first access. On the other hand, if it has reached the time limit (Y in step S909), the decision verification 706 is turned OFF (step S911). Thus, inconvenience that a service is executed for the user which takes time for decision verification more that it is necessary can be avoided.

Hereafter, it is described further in detail about a structure of the IC card according to the present invention by showing an example of electronic money payment. Here, the description is made based on an assumption that E_SRVi (refer to FIG. 18) which is an EC service is executed.

First, the user selects a product wished to be purchased with electronic money, and passes the back side of the IC card from the right side over a reader/writer of a cash dispenser. The method of selecting the product wished to be purchased does not directly relate to the present invention. Therefore, the detailed description is omitted in here.

Therefore, the IC card checks the decision verification flag 706, and judges whether or not the current access is the first access (S901). Here, the current access is the first access in the payment processing so that decision verification flag 706 is turned ON (S902). It then selects APL_ID (0120h) corresponding to the service type E_SRVi (S903).

Next, the IC card obtains the access time "five o'clock twenty-three minutes and forty-one seconds in the afternoon, on Apr. 4, 2004" (S904), and the access direction "back side right" (S905). It then stores the access time "07D5h, 04h, 04h, 0Fh, 17h, 29h" and the access direction "91h" into the history management table 704 (S906).

Here, while the number of accesses at this point is once, the number of comparisons 1203 stored in the condition management table 705 is "03h (three times)". That is, the number of accesses has not reached the number of comparisons 1203 so that the service is not executed but in waiting.

Next, the user passes the front side of the IC card from the right side over the reader/writer. Consequently, the IC card checks decision verification flag 706. In this case, it verifies whether or not decision verification flag 706 has already been turned ON. It then obtains the second access time "five o'clock twenty-three minutes forty-five seconds in the afternoon, on Apr. 4, 2004 (07D5h, 04h, 04h, 0Fh, 17h, 2Dh)" and the access direction "front side right (81h)" (S904 and 905), and stores them into history management table 704 (S906). Even at this point in time, the number of accesses has not reached the number of comparisons 1203 so that the service is not executed but in waiting.

Further, the user passes the front side of the IC card from the left side over the reader/writer. Consequently, the IC card checks decision verification flag 706. Also in this case, it verifies whether or not decision verification flag 706 has already been turned ON. It then obtains the third access time "five o'clock twenty-three minutes fifty-one seconds in the afternoon, on Apr. 4, 2004 (07D5h, 04h, 04h, 0Fh, 17h, 33h)", and the access method "front side left (82h)" (S904 and 905), and stores them into history management table 704 (S906).

Here, the number of accesses has reached three times that is the number of comparisons 1203 so that it is judged whether or not the access direction satisfies the access condition (S908). That is, time series pattern 1205 in condition management table 705 is "11h, 01h, 02h" as shown in FIG. 18. As shown in FIG. 17, the "11h, 01h, 02h" indicates "side 2 right, side 1 right, side 1 left".

Here, as described in the above, the actual access direction is right side on back side, right side on front side, and left side on front side. Indicating the front side as side 1 and the back side as side 2, they are indicated as follows: the right side on back side is side 2 right, the right side on front side is side 1 right, and the left side on front side is side 1 left. Accordingly, the actual access direction satisfies the access condition.

In addition, it is also judged whether or not the elapsed time from the first access until the completion of the third comparison has reached the time limit (S909). Here, time limit 1204 in condition management table 705 is "fifteen seconds (0Fh)". On the other hand, the first access time is "five o'clock twenty-three minutes and forty-one seconds in the afternoon, on Apr. 4, 2004". Also, the time when the comparisons for three times are completed is presumed at "five o'clock twenty-three minutes fifty-one seconds in the afternoon, on Apr. 4, 2004". Therefore, the elapsed time from the first access until the completion of the third comparison (eleven seconds) has not reached the time limit (fifteen seconds).

Thus, when all conditions are met, the payment processing with electronic money is performed (S910). After the payment processing is completed, the decision verification flag is turned OFF (S911), and the total processing is finished.

As described in the above, in the first embodiment, the service is not executed unless the IC card is passed over the reader/writer under predetermined conditions. That is, it is possible to execute an application program after sufficiently verifying the decision of the user.

Also, there is a merit that the user can execute an application program with a simple operation of passing the IC card over the reader/writer under the predetermined conditions. That is, there is no inconvenience of operating buttons and the like while verifying display contents on liquid crystal unit. With reason, in the case where buttons and the liquid crystal unit are built in the IC card, the hardware structure becomes complicated and breakable so that there is a problem that the price of the IC card is increased.

It should be noted that it is described an example of an access direction such as "right side on front side", combining the access side type (front and back sides) and one horizontal access direction type (vertical direction or horizontal direction). However, the present invention is not limited by this. That is, an access direction such as "upper left on front side (8Ah)", combining the access side type (front and back sides) and two horizontal access direction types (vertical direction and horizontal direction) may be adopted. By adopting such structure, the access direction becomes more complicated and the user's decision can be verified more certainly.

Further, while condition judgment unit 703 executes a service in here, the present invention is not limited to this. That is, condition judgment unit 703 performs only judgment processing and the structure (execution unit) for executing the service may be separately built. With such structure, if the result judged by condition judgment unit 703 is notified of the execution unit, the similar effect can be obtained.

Figure 21:
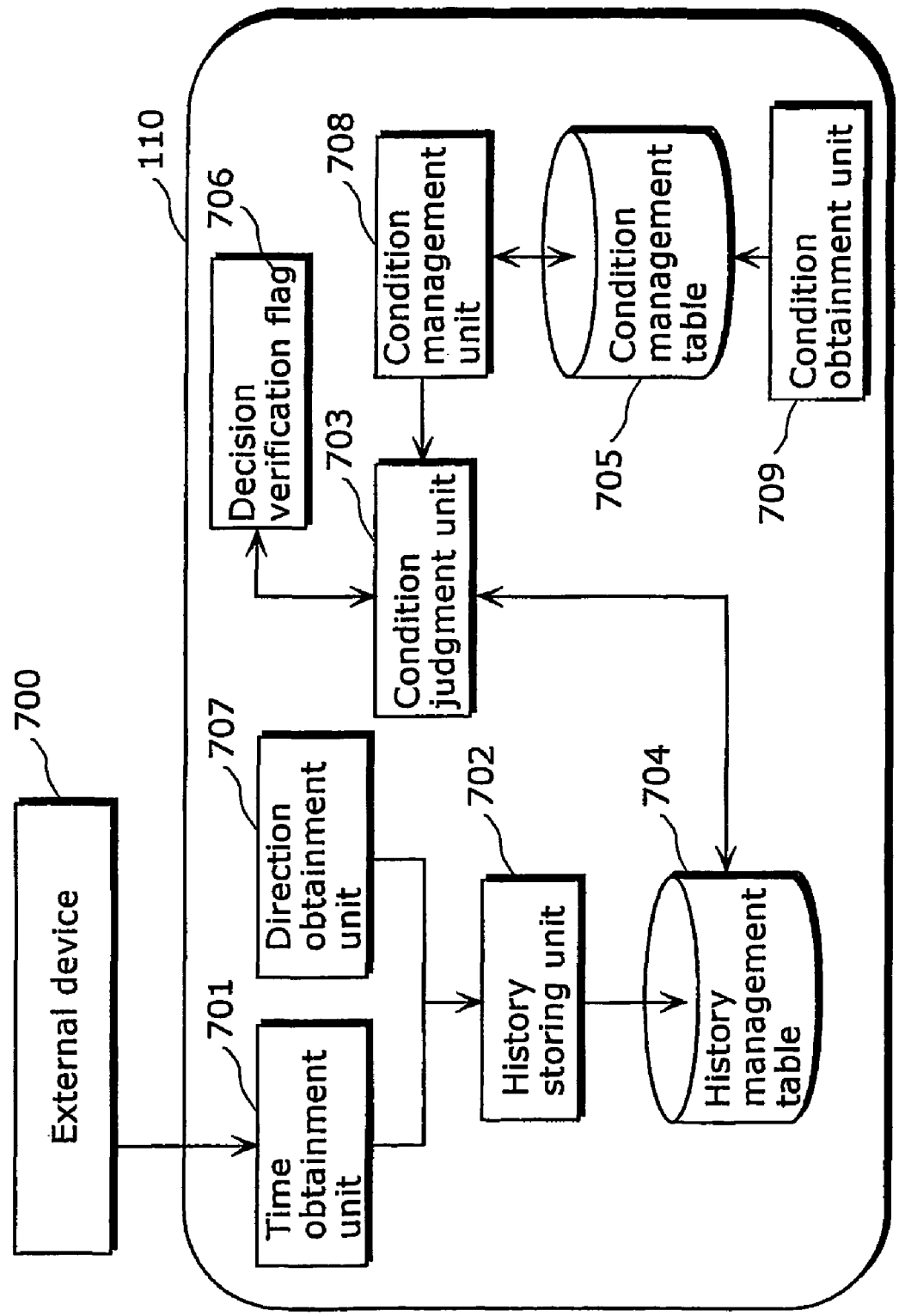
FIG. 21 is a diagram showing a software structure of another IC card according to the present invention.

Furthermore, while it is described based on an assumption that the access conditions are stored previously in the condition management table 705, the present invention is not limited to this. That is, as shown in FIG. 21, condition obtainment unit 709 which obtains access conditions from external devices and stores the access conditions in condition management table 705. Thus, when it is necessary to change the access conditions, the IC card can immediately deal with the change.

Second Embodiment

According to the first embodiment, when the user tries to execute an application program, the execution decision can be certainly verified. That is, in the first embodiment, it is assumed that the application program which the user is going to execute can be previously specified in the IC card.

Hereafter, the second embodiment is described focusing only on the difference with the first embodiment.

Figure 1:
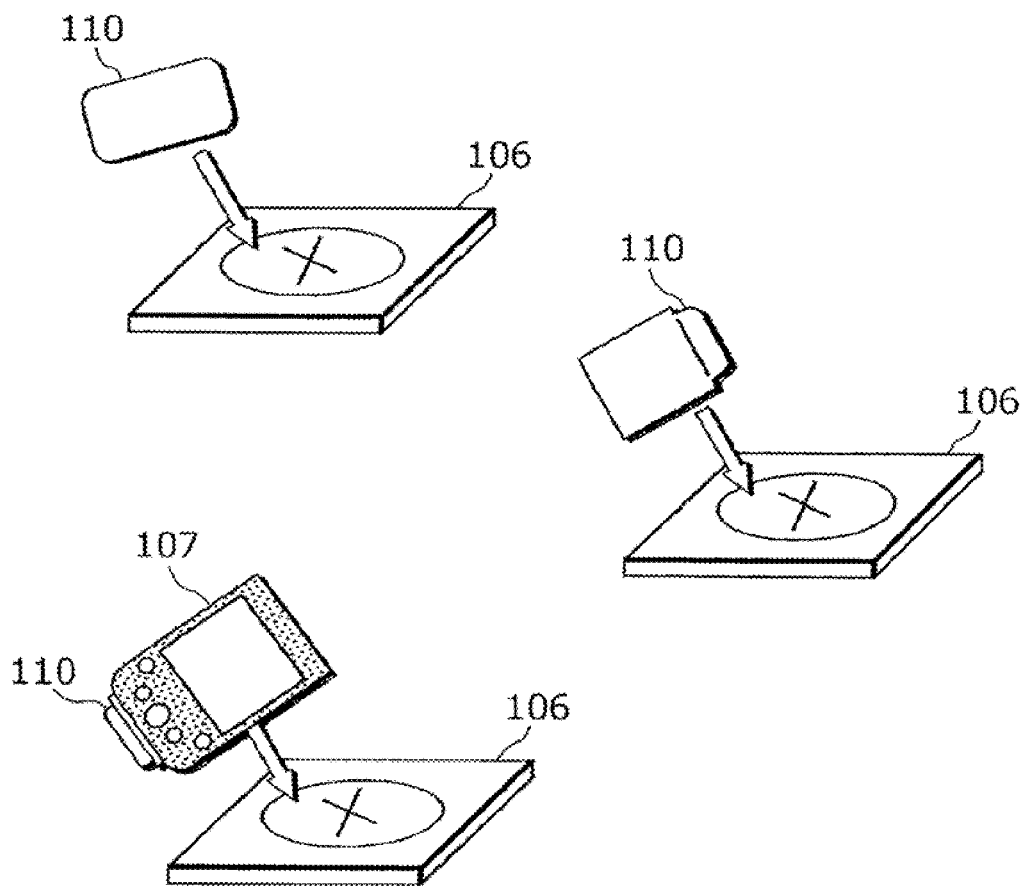
FIG. 1 is a drawing showing usages of a general IC card.
Figure 2:
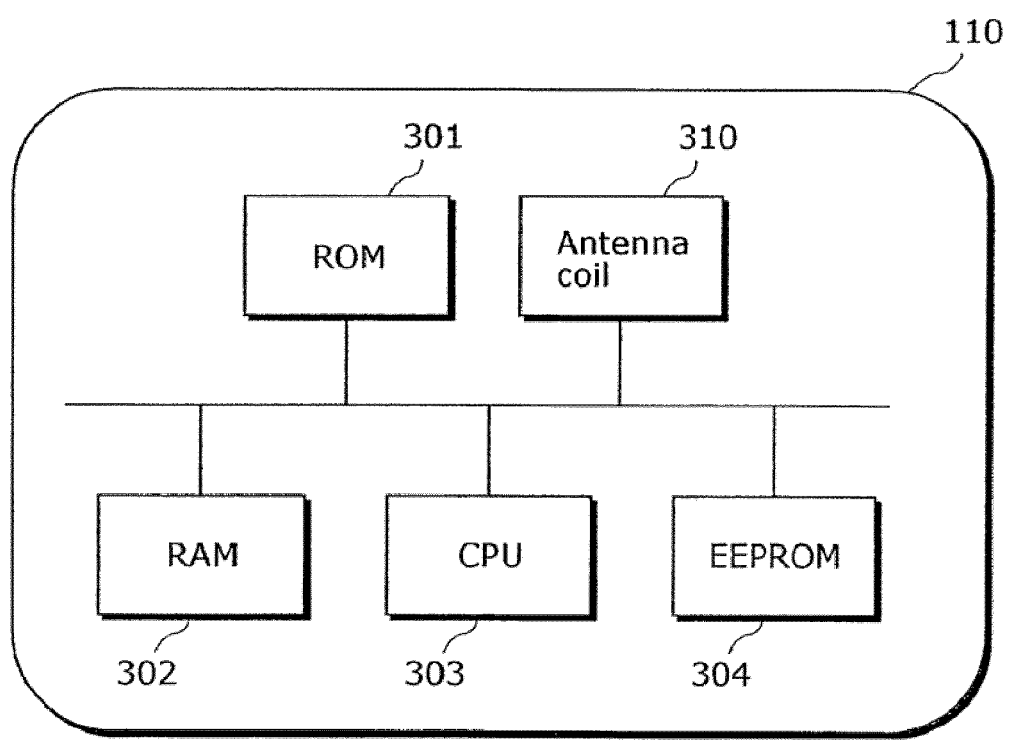
FIG. 2 is a diagram showing a hardware structure of the general IC card.
Figure 3:
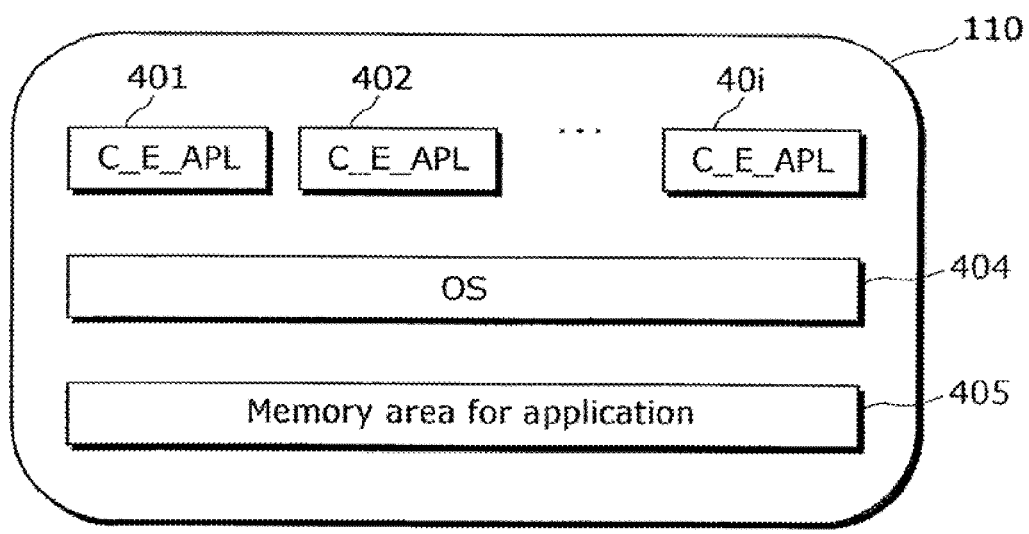
FIG. 3 is a diagram showing a software structure of the general IC card.

Here, as shown in FIG. 4, there are i numbers of E_APL 101 to 10i in EC server 100. Also, as shown in FIG. 3, there are i numbers of C_E_APL 401, 402, . . . , and 40i in IC card 110. Further, it is assumed that reader/writer 106 corresponds to these i numbers of services. That is, it is assumed an environment in which a desired service from among the i numbers of services can be selected and executed.

Figure 22:
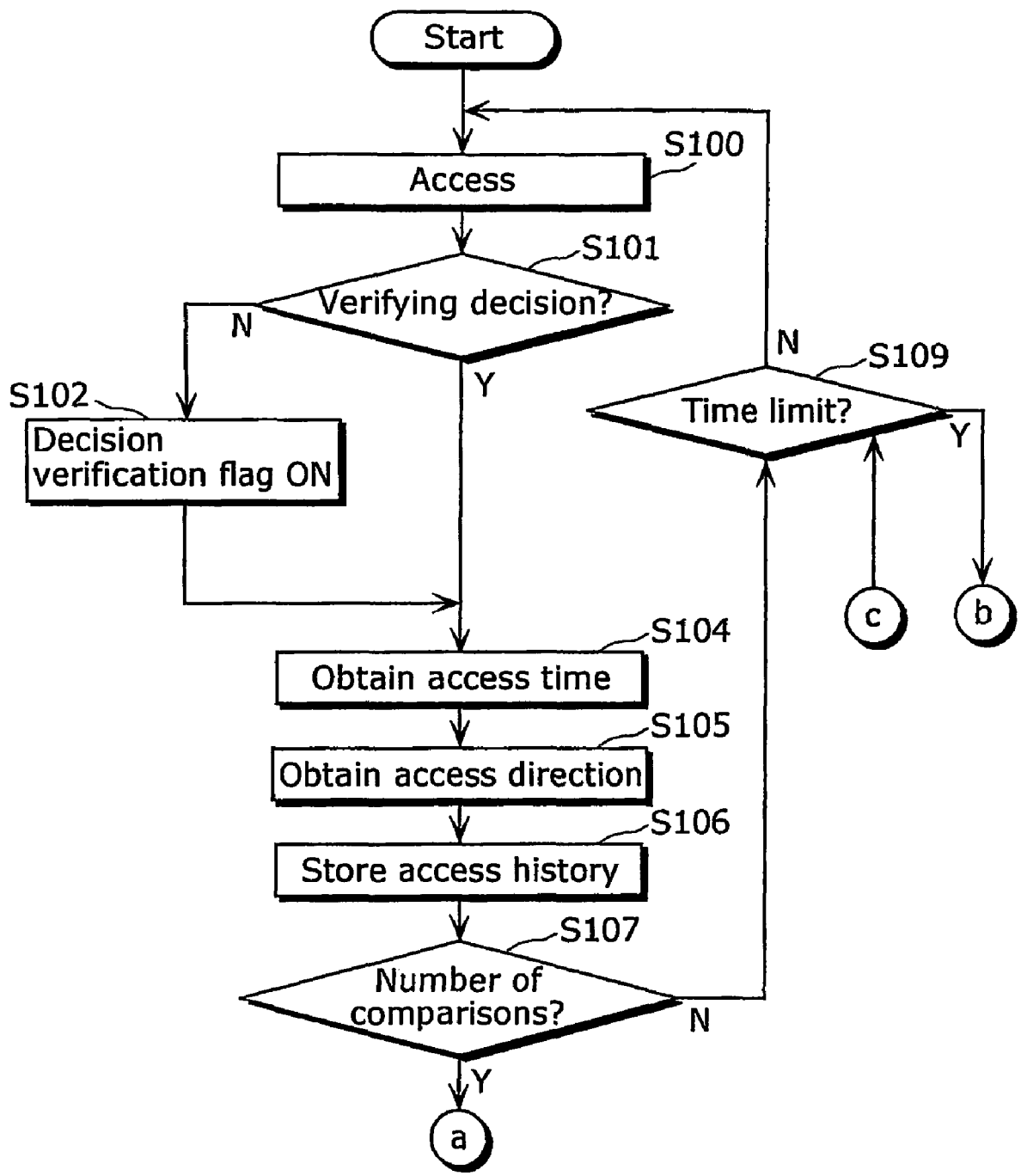
FIG. 22 is a flowchart showing a service execution procedure in the second embodiment.
Figure 23:
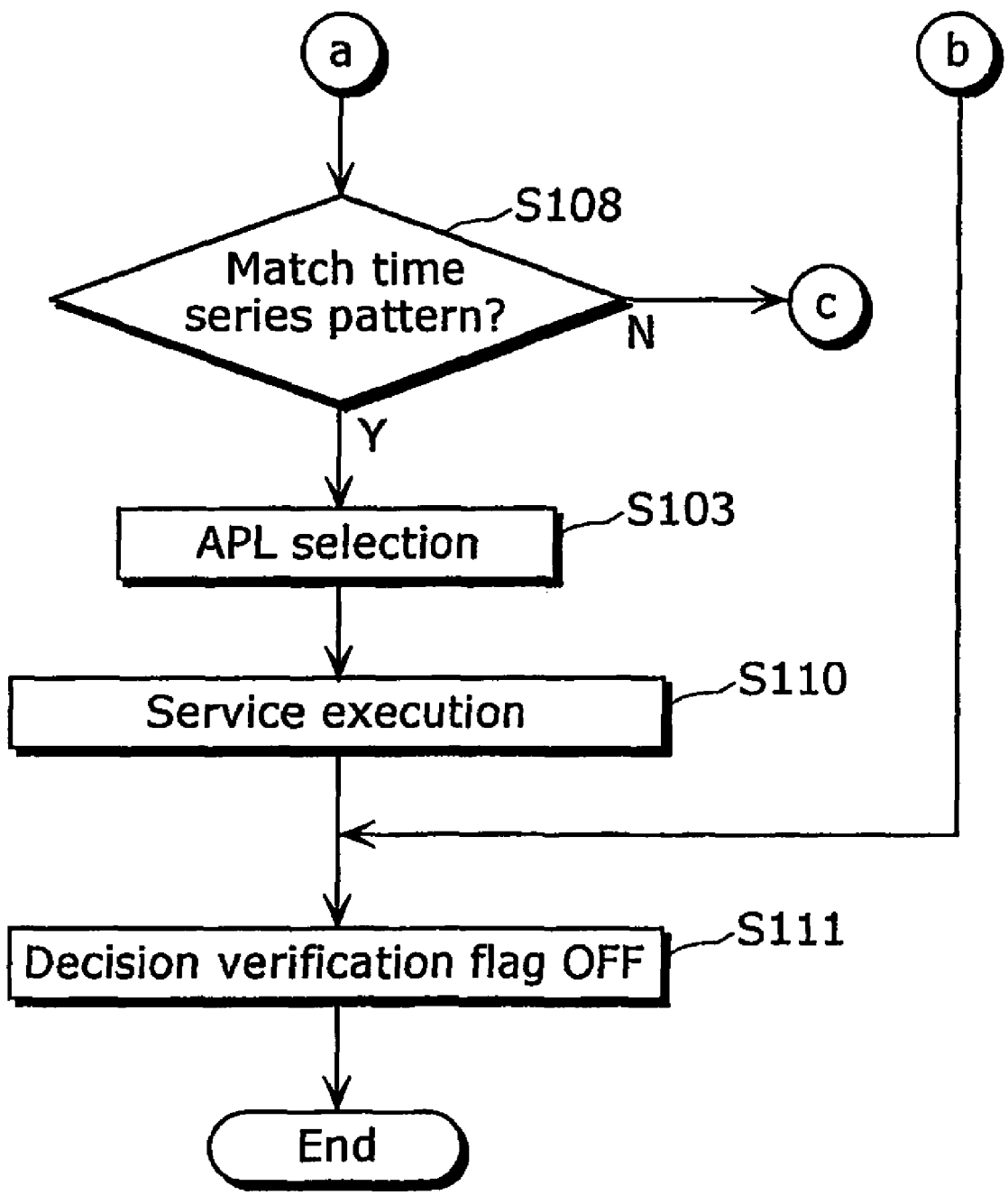
FIG. 23 is a flowchart showing a service execution procedure in the second embodiment.

FIGS. 22 and 23 are flowcharts showing service execution procedures according to the second embodiment. Hereafter, with references to FIGS. 22 and 23, the operation of the IC card according to the second embodiment is described in detail.

First, the reader/writer is accessed by passing the IC card over the reader/writer (step S100). Consequently, condition judgment unit 703 receives a command from the reader/writer, and judges whether or not the user is verifying decision (step S101).

Accordingly, when decision verification flag 706 is turned OFF (N in step S101), condition judgment unit 703 considers the current access is the first access, and turns decision verification flag 706 ON (step S102). Here, in the first embodiment, it is described that one of APL_ID 1201 is selected from condition management table 705. On the contrary, in the second embodiment, it is unclear which service out of i numbers of services is executed at this point so that special processing is not performed.

On the other hand, when the decision verification flag is turned ON (Y in step S101), condition judgment unit 703 judges that the current access is not the first access but in the middle of the series of accesses. Time obtainment unit 701 then obtains the access time from a command transmitted from the reader/writer and a portable device and the like (step S104). Also, direction obtainment unit 707 obtains an access direction of the IC card from electromotive comparing unit 313 and the like (step S105). Following that, history storing unit 702 stores a pair of the access time and access direction as access history into history management table 704 (step S106).

Here, condition management unit 708 reads out access conditions corresponding to all i numbers of services from condition management table 705, and transmits them to condition judgment unit 703. Consequently, condition judgment unit 703 reads out access history from history management table 704. It then judges whether or not the number of times when the IC card accesses the reader/writer has reached the number of comparisons (step S107). That is, the number of access times at this point is judged based on the access history. It then judges whether or not the number of comparisons matching the number of accesses exists in the access conditions corresponding to all of the i numbers of services.

Accordingly, when there is no number of comparisons 1203 matching the number of accesses at this point in time (N in step S107), condition judgment unit 703 repeats operations from step S100 to step S107. On the other hand, when there is the number of comparisons 1203 matching the number of comparisons at this point (Y in step S107), it specifies a time series pattern 1205 included in the same record as the number of comparisons 1203. It then compares time series pattern 1205 with access direction 832 included in the access history, and judges whether or not they match each other (step S108).

Accordingly, if the access direction satisfies the access conditions (Y in step S108), condition judgment unit 703 selects APL_ID 820 corresponding to the access condition (step S103). It then executes a service corresponding to the APL_ID 820 (step S110), and turns decision verification flag 706 OFF (step S111).

On the other hand, if the access direction does not satisfy the access conditions (N in step S108), condition judgment unit 703 judges whether or not it has been reached the time limit (step S109). If it has not been reached the time limit (N in step S109), the user continues verifying the decision, while if it has been reached the time limit (Y in step S109), decision verification flag 706 is turned OFF (step S111).

As described in the above, according to the second embodiment, it can be said that a user can select a desired service from among the multiple services by passing the IC card over the reader/writer under predetermined conditions. In other words, the service cannot be selected unless the IC card is passed over the reader/writer under the predetermined conditions. That is, the user can certainly verify the decision of selecting a service.

It should be noted that the matching of the time series pattern 1205 is judged after the matching of the number of comparisons 1203 is judged. However, this order of judgment is not restricted to the above order. Specifically, time series pattern 1205 corresponding to the i numbers of services and the actual access direction 832 may be compared every time when the reader/writer is accessed. Also, the similar effect can be obtained even if the matched service is executed until the comparison result reaches the final number of times 1203.

The field of applications of this invention varies so that it is not only limited to the user's decision verification. For example, the present invention may be applied to a game device, or used for verifying the user. Of course, in the case where the present invention is used for verifying the user, the access condition which is only known to the user him/herself is set in the IC card.

Third Embodiment

In the first and second embodiments, all of the decision verification processing for executing the application program is performed in the IC card. However, this invention is not limited to the above. That is, similar effect can be obtained even if a portion of the decision verification processing is performed by external devices.

Hereafter, the third embodiment is described focusing only on the difference with the first embodiment.

Figure 24:
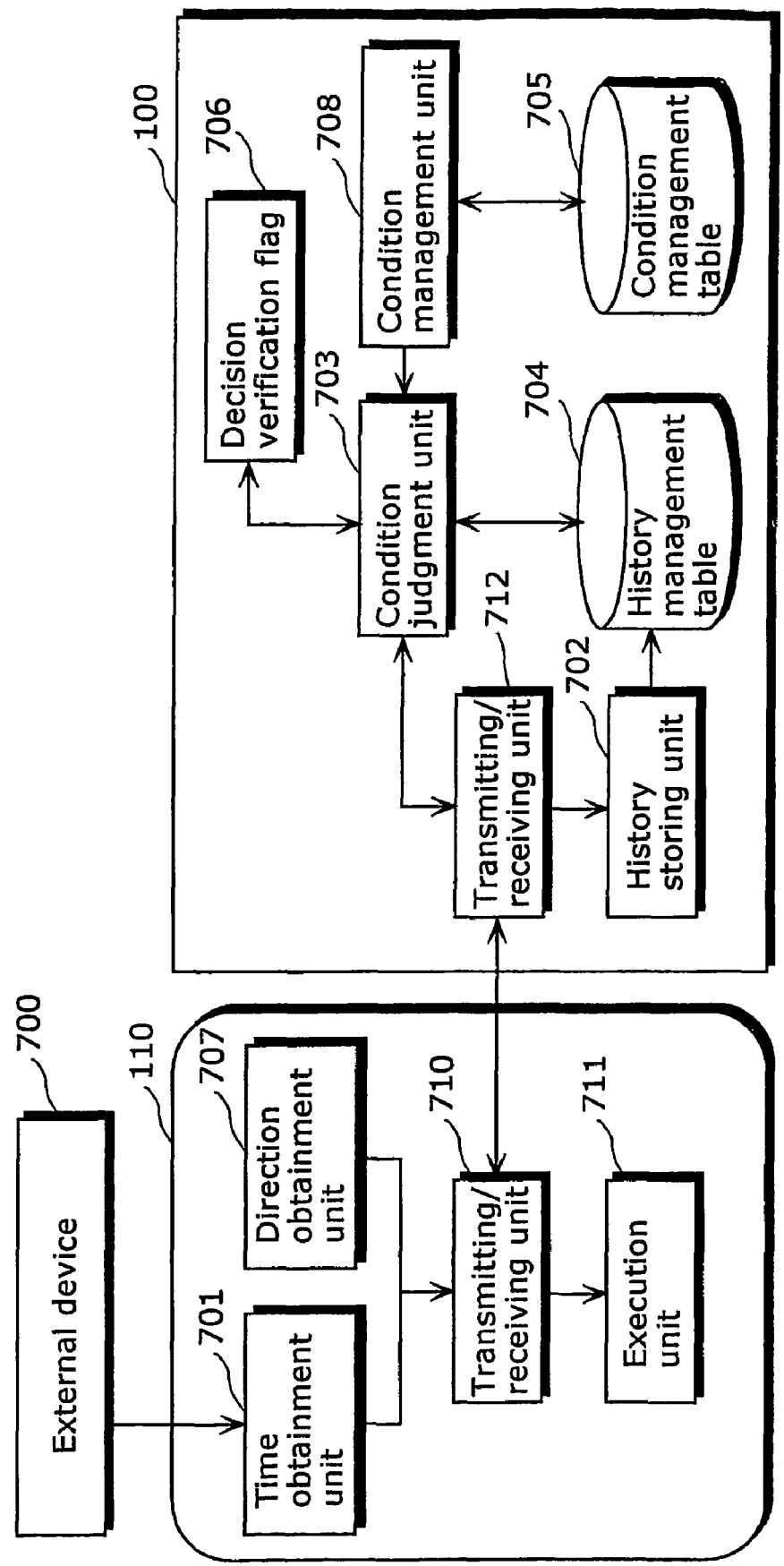
FIG. 24 is a diagram showing software structures of an IC card and an EC server in the third embodiment.

FIG. 24 is a diagram showing a software structure of an IC card and an EC server according to the third embodiment. As shown in FIG. 4, IC card 110 and server 100 are connected via network 104 and reader/writer 106.

IC card 110 includes time obtainment unit 701, direction obtainment unit 707, transmitting and receiving unit 710, and execution unit 711. Time obtainment unit 701 and direction obtainment unit 707 are as described in the first embodiment. Transmitting/receiving unit 710 transmits and receives data with EC server 100 via reader/writer 106 and the like. Execution unit 711 executes an application program. In the first embodiment, condition judgment unit 703 executes an application program. However, such execution unit 711 may be separately built in as described in the above.

EC server 100 includes history storing unit 702, condition judgment unit 703, history management table 704, condition management table 705, decision verification flag 706, condition management unit 708, and transmitting/receiving unit 712. The functions of history storing unit 702, condition judgment unit 703, history management table 704, condition management table 705, decision verification flag 706 and condition management unit 708 are same as functions of units in the IC card according to the first embodiment. Transmitting/receiving unit 712 transmits and receives IC card 110 and data via reader/writer 106 and the like.

Figure 25:
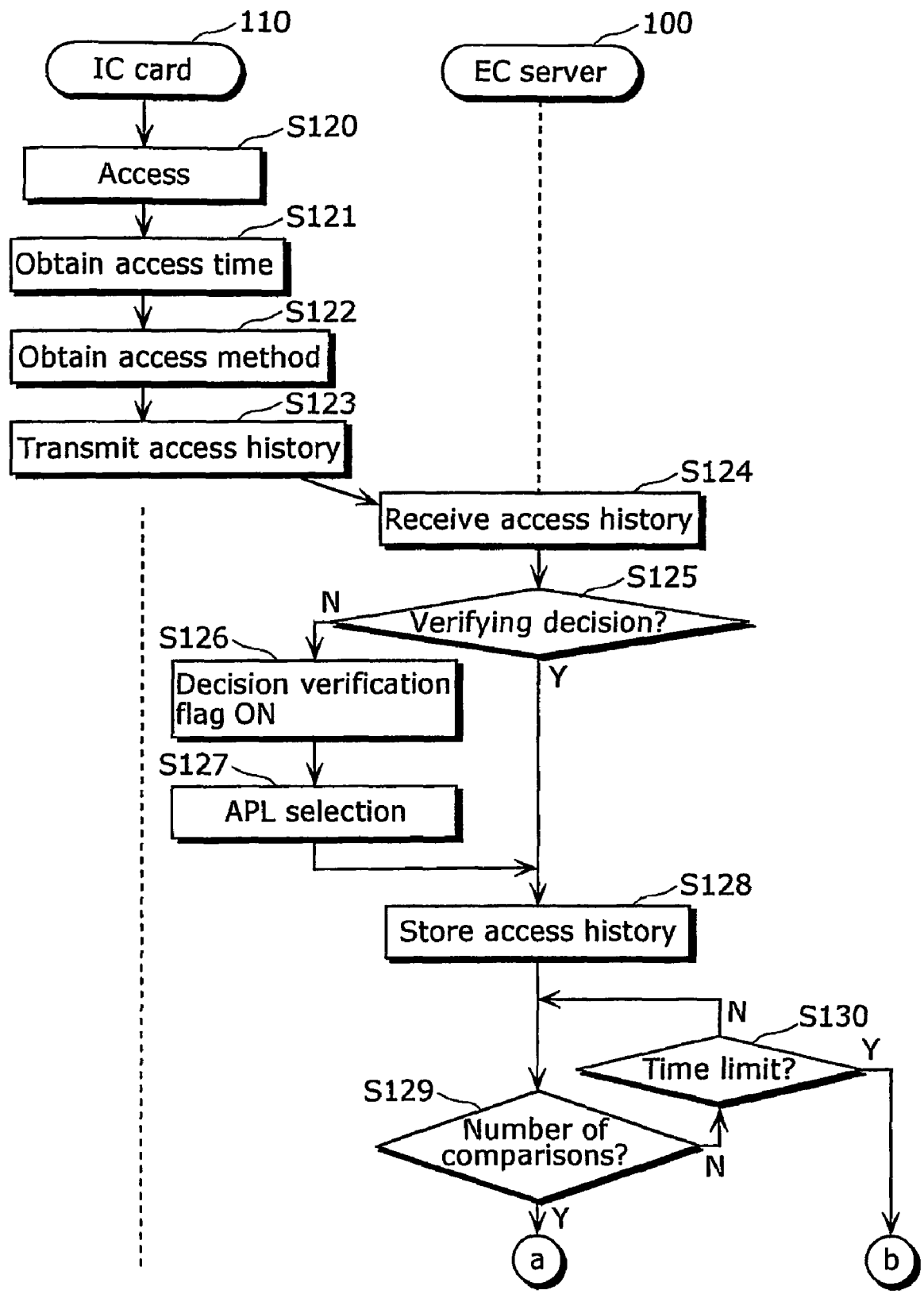
FIG. 25 is a flowchart showing a service execution procedure in the third embodiment.
Figure 26:
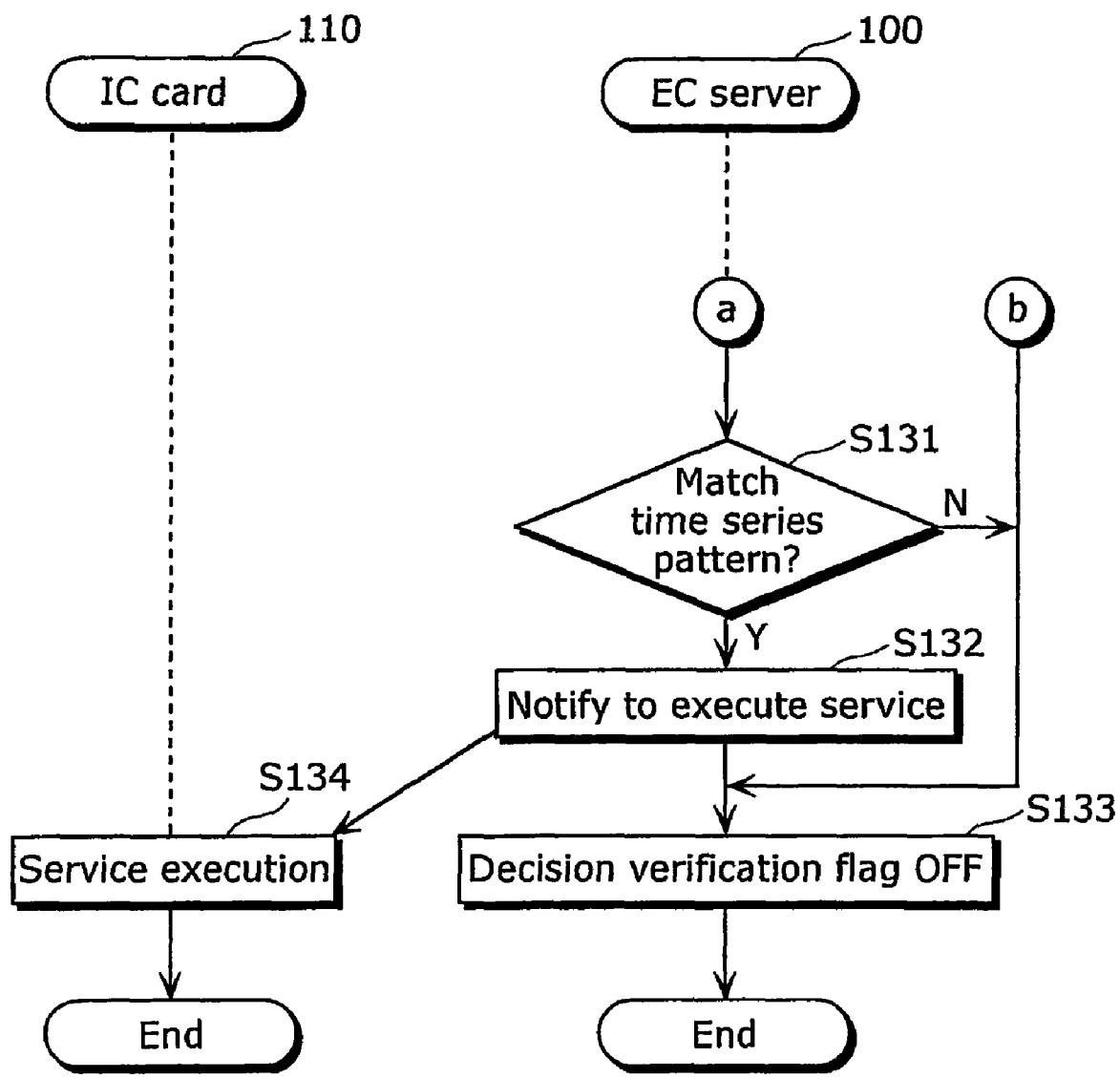
FIG. 26 is a flowchart showing a service execution procedure in the third embodiment.

FIGS. 25 and 26 are flowcharts showing service execution procedures according to the third embodiment. Hereafter, with references to FIGS. 25 and 26, it is described in detail about operations of the IC card and the EC server according to the third embodiment.

First, the reader/writer is accessed by the IC card by passing the IC card over the reader/writer (step S120). Consequently, the processing is executed in the IC card. That is, time obtainment unit 701 obtains a command from the reader/writer and the access time from a portable device and the like (step S121). Also, direction obtainment unit 707 obtains an access direction of the IC card from electromotive force comparing unit 313 (step S122). Following that, transmitting/receiving unit 710 transmits a pair of the access time and the access direction as an access history to the EC server (step S123).

Transmitting/receiving unit 712 of the EC server receives the access history (step S124). Condition judgment unit 703 then judges whether or not the user is verifying the decision (step S125).

Accordingly, if decision verification flag 706 is turned OFF (N in step S125), condition judgment unit 703 judges that the current access is the first access and turns the decision verification flag 706 ON (step S126). Also, condition management unit 708 selects one of APL_ID 1201 from condition management table 705 (step S127).

On the other hand, when the decision verification flag is turned ON (Y in step S125), condition judgment unit 703 judges that the current access is not the first access but in the middle of the series of accesses. History storing unit 702 then stores the access history into history management table 704 (step S128).

As described in the above, condition management unit 708 which selects one of APL_ID 1201 reads out an access condition corresponding to the APL_ID 1201 from the condition-management table 705, and transmits the access condition to condition judgment unit 703.

Consequently, condition judgment unit 703 reads out an access history from history management table 704. It then judges whether or not the number of times when the IC card accesses the reader/writer has reached the number of comparisons (step S129). That is, the number of accesses at this point in time is judged based on the access history, and judges whether or not the number of accesses matches the number of comparisons 1203 included in the access condition.

Therefore, if it has not been achieved the number of comparisons (N in step S129), condition judgment unit 703 judges whether or not it has been reached the time limit (step S130). On the other hand, if it has not been reached the time limit (N in step S130), the user continues verifying the decision, while in the case where it has been reached the time limit (Y in step S130), the decision verification flag 706 is turned OFF (step S133).

On the other hand, when it has been reached the number of comparisons (Y in step S129), condition judgment unit 703 judges whether or not the access direction satisfies the access condition (step S131). That is, it compares access direction 832 included in the access history with time series pattern 1205 included in the access conditions and judges whether or not they match.

Accordingly, when the access direction satisfies the access condition (Y in step S131), condition judgment unit 703 notifies the IC card via transmitting/receiving unit (notification unit) 712 that the service is executed (step S132), and turns the decision verification flag 706 OFF (step S133). While when the access direction does not meet the access conditions (N in step S131), it does not perform the notification, but turns the decision verification flag 706 OFF (step S133).

As described in the above, in the third embodiment, a portion of the construction unit built in the IC card is built in the EC server. Therefore, the EC server can perform a part of the decision verification by executing the application program.

It should be noted that the described operations are only examples. For example, the access history is transmitted to the EC server every time when the IC card accesses the reader/writer. However, multiple access histories may be to the EC server at once.

It also should be noted that transmitting/receiving unit 712 of the EC server receives an access history from the IC card in step S124. However, the access history includes an access direction as described in the above so that transmitting/receiving unit 712 of the EC server functions as a direction obtainment unit in the step S124.

Furthermore, it is described that the EC server performs a part of the decision verification as an example. However, a type of the server is not, of course, restricted to the EC server. In addition, it is not limited that which part of the decision verification processing is performed by the EC server. Here, in addition to the EC server and IC card, another device may perform a part of the decision verification.

First Supplemental Remarks of First Embodiment

In the above, embodiments are described. It should be noted that each function of direction obtainment unit, time obtainment unit, history storing unit, and condition management unit is typically realized by which a CPU executes a computer program. There are two cases of the program: the program previously stored in a ROM in an IC card; and the program downloaded from outside and stored in a nonvolatile memory in the IC card.

Second Supplemental Remarks of Second Embodiment

Furthermore, each of the functions may be realized by the LSI which is an integrated circuit. Theses functions may be constructed separately in a chip form or some of them may be constructed together in a chip form.

Figure 27:
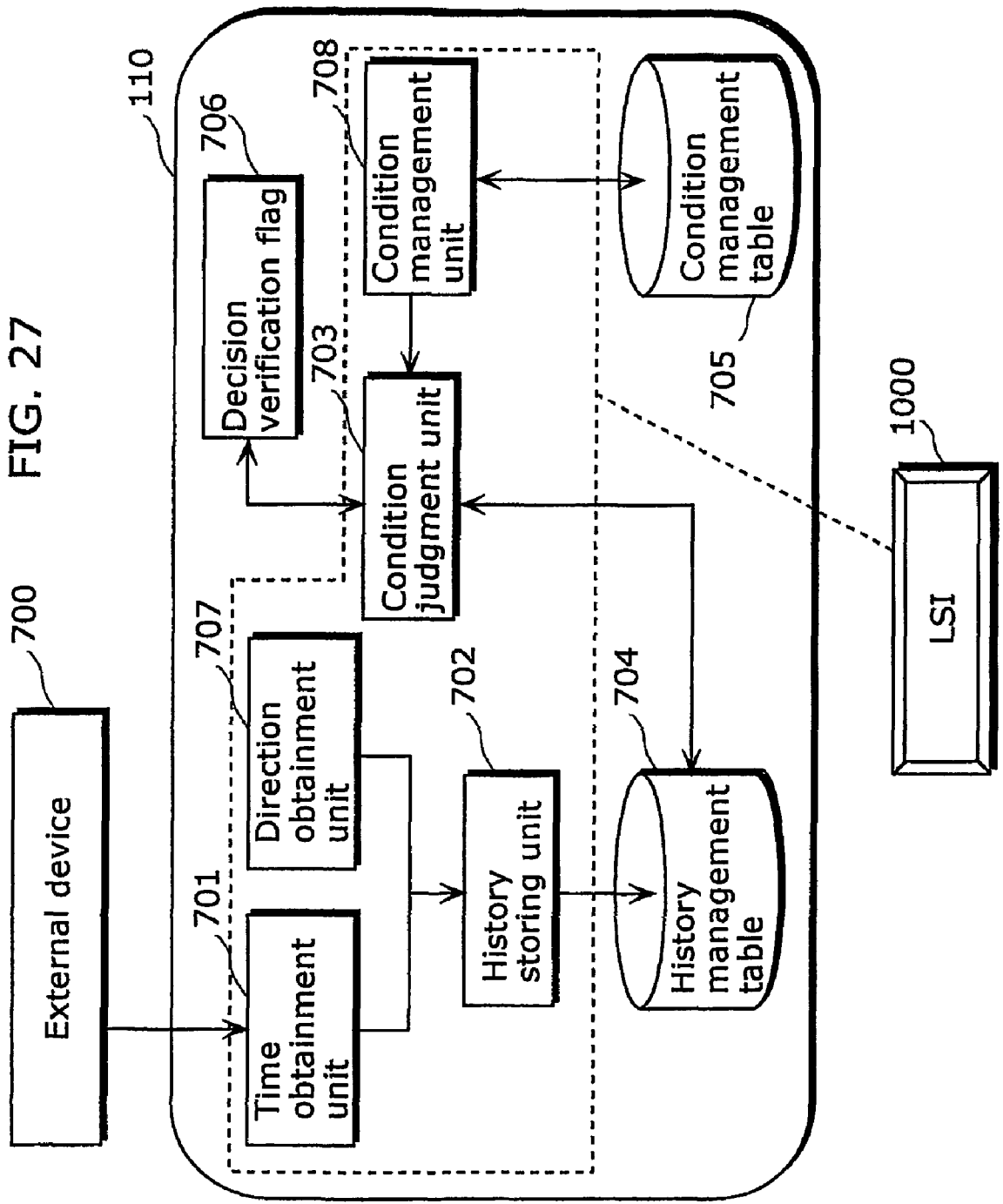
FIG. 27 is a diagram showing an example when a characteristic construction unit of the IC card according to the present invention is constructed in an integrated circuit.

FIG. 27 is a diagram showing an example where a characteristic construction unit of the IC card according to the present invention is constructed in an integrated circuit. LSI 1000 is an example of the integrated circuit, and realizes functions of the construction unit included in an area indicated by dashed lines. The integrated circuit may be called as an IC, a system LSI, a super LSI, and an ultra LSI depending on the difference of the integration density.

Further, not being restricted to the LSI, the integrated circuit may be realized by a special circuit or a general processor. After the LSI is manufactured, the followings may be used: a Field Programmable Gate Array (FPGA) in which the program can be stored; or a reconfigurable processor which can reconfigure a connection and setting of a circuit cell in the LSI. Furthermore, if new technology (biotechnology, organic chemical technology etc.) for constructing an integrated circuit is introduced as a replace of the LSI following a development of semiconductor technology or by a new another technology, the function may be constructed in an integrated circuit using the newly introduced technology.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

A semiconductor memory card according to the present invention is useful as a contactless IC memory card and the like which needs to execute an application program after surely verifying an intention of a user.

The invention claimed is:

1. A semiconductor memory card which performs contactless communication with a reader/writer, the semiconductor memory card comprising:
 a direction obtainment unit operable to obtain two or more first access direction types which indicate positions of the semiconductor memory card with respect to the reader/writer;

a condition management unit operable to previously hold and manage an access condition including two or more second access directions types;

a condition judgment unit operable to compare the two or more first access direction types obtained by said direction obtainment unit with the two or more second access direction types included in the access condition held in said condition management unit, and to judge whether or not the first and second access direction types match each other; and an execution unit operable to execute a predetermined application program when said condition judgment unit judges that the first and the second access direction types match each other.

2. A semiconductor memory card according to claim 1, wherein the access condition includes a time series pattern of the second access direction types, and
said condition judgment unit is operable to compare the first and second access direction types according to the time series pattern.

3. A semiconductor memory card according to claim 1, wherein one of the access direction types is an access side type of the semiconductor memory card.

4. A semiconductor memory card according to claim 1, wherein one of the access direction types is a horizontal access direction type on a same side of the semiconductor memory card.

5. A semiconductor memory card according to claim 1, wherein said direction obtainment unit is operable to obtain the first access direction types upon a lapse of a predetermined time from a time point at which electric power is generated by electromagnetic waves supplied by the reader/writer exceeds a predetermined voltage.

6. A semiconductor memory card according to claim 1, wherein the access condition includes a number of comparisons of the first and second access direction types, and
said condition judgment unit is operable to compare the first and second access direction types as many as the number of comparisons.

7. A semiconductor memory card according to claim 6, wherein the access condition includes a time limit for the semiconductor memory card to access the reader/writer,
said condition judgment unit is operable to judge whether or not an elapsed time from a first access to a completion of comparisons as many as the number of comparisons is within the time limit, and
said execution unit is operable to execute the predetermined application program when said condition judgment unit judges that the elapsed time is within the time limit.

8. A semiconductor memory card according to claim 1, further comprising
a condition obtainment unit operable to obtain the access condition from an external device,
wherein said condition management unit is operable to store and manage the access condition.

9. A server which is connected to a reader/writer via a network, the reader/writer performing contactless communication with a semiconductor memory card, the server comprising:
a direction obtainment unit operable to obtain two or more first access direction types which indicate positions of the semiconductor memory card with respect to the reader/writer;
a condition management unit operable to previously hold and manage an access condition including two or more second access direction types;
a condition judgment unit operable to compare the two or more first access direction types obtained by said direction obtainment unit with the two or more second access direction types included in the access condition held in said condition management unit, and to judge whether or not the first and second access direction types match each other, and
a notification unit operable to notify the judgment result of the semiconductor memory card.

10. A method of providing a service by a system including a semiconductor memory card which performs contactless communication with a reader/writer, and a server connected to the reader/writer via a network, the method comprising:
obtaining two or more first access direction types which indicate positions of the semiconductor memory card with respect to the reader/writer;
comparing two or more first access direction types obtained with two or more of second access direction types previously held in a storing unit, and judging whether or not the first and second access direction types match each other; and
executing a predetermined application program when it is judged that the first and second access direction types match each other.

11. A computer-readable recording medium in which a program for performing contactless communication with a reader/writer is recorded, the program causing a computer to perform steps comprising:
obtaining two or more first access direction types which indicate positions of the semiconductor memory card with respect to the reader/writer;
comparing the two or more first access direction types obtained with two or more second access direction types previously held in a storing unit, and judging whether or not the first and second access direction types match each other; and
executing a predetermined application program when it is judged that the first and second access direction types match each other.

12. An integrated circuit for use with a semiconductor memory card which performs contactless communication with a reader/writer, the integrated circuit comprising:
a direction obtainment unit operable to obtain two or more first access direction types which indicate positions of the semiconductor memory card with respect to the reader/writer;
a condition management unit operable to previously hold and manage an access condition including two or more second access direction types;
a condition judgment unit operable to compare the two or more first access direction types obtained by said direction obtainment unit with the two or more second access direction types previously held in said condition management unit, and judging whether or not the first and second access direction types match each other; and
an execution unit operable to execute a predetermined application program when said condition judgment unit judges that the first and second access direction types match each other.

* * * * *